US010728624B2

(12) United States Patent
Singh et al.

(10) Patent No.: US 10,728,624 B2
(45) Date of Patent: Jul. 28, 2020

(54) SYSTEMS AND METHODS FOR MODIFYING FAST-FORWARD SPEEDS BASED ON THE USER'S REACTION TIME WHEN DETECTING POINTS OF INTEREST IN CONTENT

(71) Applicant: Rovi Guides, Inc., San Jose, CA (US)

(72) Inventors: Gyanveer Singh, Bihar (IN); William Thomas, Evergreen, CO (US)

(73) Assignee: Rovi Guides, Inc., San Jose, CA (US)

( * ) Notice: Subject to any disclaimer, the term of this patent is extended or adjusted under 35 U.S.C. 154(b) by 6 days.

(21) Appl. No.: 15/858,757

(22) Filed: Dec. 29, 2017

(65) Prior Publication Data

US 2019/0208282 A1     Jul. 4, 2019

(51) Int. Cl.
*H04N 9/47* (2006.01)
*H04N 21/472* (2011.01)
(Continued)

(52) U.S. Cl.
CPC . *H04N 21/47217* (2013.01); *G08B 13/19665* (2013.01); *H04N 5/783* (2013.01);
(Continued)

(58) Field of Classification Search
CPC ............... G06F 3/04842; G06F 3/0482; G06F 3/04847; G06F 3/0484
(Continued)

(56) References Cited

U.S. PATENT DOCUMENTS 8,229,286 B2      7/2012  Ostergaard et al.
2002/0120925 A1*  8/2002  Logan ...................... A23L 2/52
                                                     725/9
(Continued)

FOREIGN PATENT DOCUMENTS

EP           2066128       6/2009
WO        WO2000062298   10/2000
(Continued)

OTHER PUBLICATIONS

PCT International Search Report and Written Opinion for International Application No. PCT/US2018/062120, dated Feb. 5, 2019 (15 Pages).

*Primary Examiner* — Scott T Baderman
*Assistant Examiner* — Hassan Mrabi
(74) *Attorney, Agent, or Firm* — Haley Guilano LLP

(57) ABSTRACT

Systems and methods are described for modifying a fast-forwarding speed based on a reaction time of a user when a frame of interest is detected. A media guidance application may receive a command from a user to fast-forward through a media asset and may execute a fast-forwarding operation through frames of the media asset. The media guidance application may detect that the fast-forwarding operation is approaching a frame of interest to the viewer. The media guidance application may reduce the fast-forwarding speed to a second speed slower than the first speed, where the second speed is determined based on an estimated reaction time of the user. The media guidance application may receive a command to resume playback from the user while the fast-forwarding operation is occurring at the second speed and may play back the media asset at a default playback speed from a point corresponding to a moment when the command was received.

16 Claims, 10 Drawing Sheets

(51) Int. Cl.
*H04N 5/91* (2006.01)
*H04N 21/2387* (2011.01)
*H04N 5/783* (2006.01)
*G08B 13/196* (2006.01)
*H04N 9/82* (2006.01)
*H04N 21/432* (2011.01)
*H04N 21/45* (2011.01)
*H04N 21/466* (2011.01)
*H04N 21/482* (2011.01)

(52) U.S. Cl.
CPC ............. *H04N 5/91* (2013.01); *H04N 9/8205* (2013.01); *H04N 21/2387* (2013.01); *H04N 21/4325* (2013.01); *H04N 21/4532* (2013.01); *H04N 21/4667* (2013.01); *H04N 21/4821* (2013.01)

(58) Field of Classification Search
USPC ........................................................ 715/720
See application file for complete search history.

(56) References Cited

U.S. PATENT DOCUMENTS

| | | | |
|---|---|---|---|
| 2004/0189691 A1* | 9/2004 | Jojic | .................... G11B 27/005 |
| | | | 715/720 |
| 2005/0271361 A1* | 12/2005 | Aoki | ........................ H04N 7/01 |
| | | | 386/344 |
| 2008/0155585 A1 | 6/2008 | Craner et al. | |
| 2010/0077435 A1 | 3/2010 | Kandekar et al. | |
| 2011/0249956 A1 | 10/2011 | Komai | |
| 2011/0293252 A1 | 12/2011 | Greenfield | |
| 2015/0037000 A1 | 2/2015 | Bixby | |
| 2015/0189387 A1* | 7/2015 | Golyshko | ........ H04N 21/47202 |
| | | | 725/12 |
| 2017/0257410 A1* | 9/2017 | Gattis | .................... H04L 51/32 |

FOREIGN PATENT DOCUMENTS

| | | |
|---|---|---|
| WO | WO2004025953 | 3/2004 |
| WO | WO2007097218 | 8/2007 |

* cited by examiner

SYSTEMS AND METHODS FOR MODIFYING FAST-FORWARD SPEEDS BASED ON THE USER'S REACTION TIME WHEN DETECTING POINTS OF INTEREST IN CONTENT

BACKGROUND

Modifying a resumption point in a fast-forward operation during playback of a media asset based on a reaction time of a user is a technique used to help the user resume playback at the user's intended playback position when approaching a frame of interest in the media asset. The related art describes various ways of rewinding content to correct for the user overshooting the intended play position when issuing a command to resume playback during a fast-forwarding operation. For example, the related art describes systems that play back content a threshold amount of time (e.g., 30 seconds) before the time at which the user issues a command to resume content (e.g., a command to "play" when in a fast-forwarding operation). Typical media applications correct potential playback commands that overshoot the intended playback position but fail to consider adjusting a fast-forward operation itself to avoid overshooting an intended playback position.

SUMMARY

Systems and methods are provided herein for modifying a fast-forwarding speed based on a reaction time of a user when a frame of interest is detected. For example, a media guidance application may receive a fast-forward command from a user to fast-forward through content. When the system detects a frame of interest is approaching (e.g., an important scene in the content, or a scene the user would be likely to enjoy), the media guidance application may reduce the fast-forward speed to a speed determined based on the user's reaction time to allow playback to resume at the user's requested location without correction in the media asset when the user resumes playback (e.g., presses the "play" button on the remote controller).

To this end and others, in some aspects of the disclosure, a media guidance application may receive a command from a user to fast-forward through a media asset. For example, the media guidance application may receive a command from a user (e.g., the user selecting the "fast-forward" button on a remote controller) to fast-forward through a media asset (e.g., the movie, Kill Bill Volume 1).

In some embodiments, when the media guidance application receives the command, the media guidance application may execute a fast-forwarding operation through frames of the media asset at a first speed. For example, the media guidance application may fast-forward through frames of the media asset (e.g., Kill Bill Volume 1) at a first speed (e.g., 3 times as fast as the normal speed).

The media guidance application may detect that the fast-forwarding operation is approaching a frame of interest to the viewer. For example, the media guidance application may detect, based on the metadata of the media asset, an upcoming frame of interest to the viewer.

In response to detecting that the fast-forwarding operation is approaching the frame of interest, the media guidance application may reduce the fast-forwarding speed to a second speed slower than the first speed. For example, when the media guidance application detects an approaching frame of interest, the media guidance application may reduce the fast-forwarding speed to a second speed (e.g., 1.5×) slower than the first speed (e.g., 3×).

In some embodiments, when determining the second speed, the media guidance application may retrieve, from a profile for the user, a plurality of reaction times of the user. For example, the media guidance application may retrieve, from a profile for the user, a plurality of reaction times of the user (e.g., reaction times related to when the user resumes playback of the media asset).

In some embodiments, when retrieving, from the profile for the user, the plurality of reaction times of the user, the media guidance application may retrieve, from a database, a plurality of data entries corresponding to rewind operations, where each rewind operation was initiated by the user within a predetermined time after the user issued an operation to resume playback during a fast-forward operation. For example, the media guidance application may retrieve, from a database that stores command histories, a plurality of data entries that correspond to rewind operations.

The media guidance application may determine, from a data entry in the plurality of data entries, a number of frames in a plurality of frames that the user rewinds through before resuming playback of the media asset. For example, the media guidance application may determine the number of frames by multiplying the total time of playback the user rewinds through by the frames per second characteristic of the media asset.

The media guidance application may determine from the number of frames the plurality of reaction times. For example, the media guidance application may determine the plurality of reaction times from the number of frames by assigning each number of frames at a specific rewind speed in a rewind operation to be a reaction time.

In some embodiments when the media guidance application calculates, from the reaction times, the estimated reaction time of the user, the media guidance application may determine, from the data entry, a length of time of the rewind operation. For example, the media guidance application may determine, from the number of frames rewound and the frames per second characteristic, a length of time of the rewind operation.

The media guidance application may calculate, from the number of frames and the length of time of the rewind operation, a reaction time of the user in a plurality of reaction times of the user. For example, the media guidance application may calculate the reaction time (e.g., 1 second) from the length of time, the number of frames of the rewind operation, and the rewind speed.

The media guidance application may determine, from the plurality of reaction times of the user, an average reaction time of the user, wherein the average reaction time is the estimated reaction time. For example, the media guidance application may determine from the plurality of reaction times of the user (e.g., 1 second, 1.5 seconds, 2 seconds, 0.5 seconds, 1 second) an average reaction time of the user (e.g., 1 second).

The media guidance application may calculate, from the reaction times, an estimated reaction time of the user. For example, the media guidance application may calculate, using the average reaction time of the user, the estimated reaction time of the user.

In some embodiments, when the media guidance application is calculating, from the reaction times, the estimated reaction time of the user, the media guidance application may retrieve, from a profile for the user, a current age of the user. For example, the media guidance application may retrieve, from the profile for the user, the current age of the user (e.g., 75 years old).

The media guidance application may retrieve, from the profile, at least one reaction time of the user when an age of the user was the current age of the user. For example, the media guidance application may retrieve, from the profile, at least one reaction time (e.g., 3 seconds) when the age of the user was the current age of the user (e.g., 75 years old).

The media guidance application may adjust the reaction time of the user to an adjusted reaction time based on the current age of the user. For example, the media guidance application may adjust the reaction time of the user (e.g., 3 seconds) to an adjusted reaction time (e.g., 5 seconds) based on the current age of the user (e.g., 75 years old).

The media guidance application may assign the adjusted reaction time to be the estimated reaction time of the user. For example, the media guidance application may assign the adjusted reaction time to be the estimated reaction time (e.g., 5 seconds).

In some embodiments, when the media guidance application is calculating, from the reaction times, the estimated reaction time of the user, the media guidance application may determine a time when the command from the user to fast-forward through the media asset was received. For example, the media guidance application may determine the time (e.g., 11 pm) when the command from the user to fast-forward through the media asset was received.

The media guidance application may retrieve, from a database of times, where each time has a corresponding reaction time factor, a reaction time factor. For example, the media guidance application may retrieve, from a database of times, a reaction time factor (e.g., a reaction time factor of 1.5× for 11 pm).

The media guidance application may calculate, using the reaction time factor and the reaction times, a corresponding reaction time, where the corresponding reaction time is the estimated reaction time. For example, the media guidance application may calculate, using the reaction time factor (e.g., 1.5×) and the reaction times (e.g., 2 seconds), a corresponding reaction time (e.g., 3 seconds).

In response to calculating the estimated reaction time of the user, the media guidance application may determine a second speed from the estimated reaction time of the user. For example, the media guidance application may determine a second speed (e.g., 1.2×) from the estimated reaction time of the user (e.g., 3 seconds) by retrieving a speed corresponding to the estimated reaction time of the user from a lookup table.

The media guidance application may receive a command to resume playback from the user while the fast-forwarding operation is occurring at the second speed. For example, the media guidance application may receive a command to resume playback (e.g., the user presses the "play" button on a remote controller) from the user while the fast-forwarding operation is occurring at the second speed.

In some embodiments, when the media guidance application receives the command to resume playback from the user while the fast-forwarding operation is occurring at the second speed, the media guidance application may determine a threshold number of frames, wherein the threshold number of frames is a predetermined number of frames before the frame of interest to the viewer. For example, the media guidance application may determine the threshold number of frames (e.g., 100) based on the user's viewing history before the frame of interest to the viewer.

The media guidance application may determine that the user does not send the command to resume playback within the threshold number of frames. For example, the media guidance application may determine that the user does not send the command to resume playback (e.g., the user does not press the "play" button on the remote controller) within the threshold number of frames (e.g., 100).

The media guidance application may increase the fast-forwarding speed from the second speed to the first speed. For example, the media guidance application may increase the fast-forward speed from the second speed (e.g., 1.5×) to the first speed (e.g., 3×).

In some embodiments, the media guidance application may receive a command from the user that overrides the command to fast-forward at the second speed. For example, the media guidance application may receive a command from the user that overrides the command to fast-forward at the second speed (e.g., the user presses the "fast-forward" button on the remote controller).

The media guidance application may determine, based on the override command, a third speed. For example, the media guidance application may determine, based on the override command (e.g., how many times the user has pressed the "fast-forward" button), a third speed (e.g., 2×).

The media guidance application may increase the fast-forwarding speed from the second speed to the third speed. For example, the media guidance application may increase the fast-forwarding speed from the second speed (e.g., 1.5×) to the third speed (e.g., 2×).

In some embodiments, when the media guidance application reduces the fast-forwarding to the second speed, the media guidance application may determine a threshold number of frames from a current frame, where the frame is a potential frame of interest. For example, the media guidance application may determine a threshold number of frames (e.g., 100 frames) from a current frame, where the frame is a potential frame of interest (e.g., a frame showing an action scene in Kill Bill Volume 1).

The media guidance application may generate for display the potential frame of interest within an overlay on top of the media asset. For example, the media guidance application may generate for display the potential frame of interest (e.g., the frame showing an action scene in Kill Bill Volume 1) within an overlay on top of the media asset (e.g., an overlay on top of the Kill Bill Volume 1 movie).

In some embodiments, the media guidance application may retrieve, from the profile, preferences for the user. For example, the media guidance application may retrieve, from the profile, preferences for the user (e.g., the user's favorite genres, actors/actresses, social media preferences, etc.).

The media guidance application may determine, from metadata for the at least one frame within a plurality of frames, characteristics of the frame. For example, the media guidance application may determine characteristics of the frame from the metadata (e.g., title, genre, etc.) of the frame.

The media guidance application may compare the characteristics of the at least one frame with the preferences for the user. For example, the media guidance application may compare the characteristics of the at least one frame (e.g., actors/actresses in the frame, genre, scene, etc.) with the preferences for the user (e.g., user's favorite actors/actresses).

The media guidance application may determine, from the comparison, the potential frame of interest. For example, the media guidance application may determine that the frame that contains the user's favorite actress (e.g., Lucy Liu) is the potential frame of interest.

The media guidance application may generate for display a preview overlay over the media asset. For example, the media guidance application may generate for display a preview overlay (e.g., an overlay displaying an image over the middle of the media asset being displayed) over the media asset (e.g., Kill Bill Volume 1).

The media guidance application may generate for display, in the preview overlay, frames later in time than a current point of the fast-forwarding operation, wherein the frames in the preview overlay are updated according to a preview frequency that is set to an initial preview frequency. For example, the media guidance application may generate for display, in the preview overlay, frames later in time (e.g., the Crazy 88 fight scene) than a current point of the fast-forward operation (e.g., the Bride waking up from her coma), wherein the frames in the preview overlay are updated according to a preview frequency (e.g., once every 5 seconds) that is set to an initial preview frequency (e.g., once every 5 seconds).

The media guidance application may detect that the current point of the fast-forwarding operation is within a first frequency threshold of the frame of interest. For example, the media guidance application may detect that the current point of the fast-forwarding operation is within a first frequency threshold (e.g., once every 5 seconds) of the frame of interest.

In response to detecting that the current point of the fast-forwarding operation is within the first frequency threshold of the frame of interest, the media guidance application may adjust the preview frequency so that frames in the preview overlay are changed more often than when at the initial preview frequency. For example, the media guidance application may adjust the preview frequency so that frames in the preview overlay are changed more often (e.g., once every second) than when at the initial preview frequency (e.g., once every 5 seconds).

The media guidance application may detect that the current point of the fast-forwarding operation is within a second frequency threshold of the frame of interest. For example, the media guidance application may detect that the current point of the fast-forwarding operation is within a second frequency of the frame of interest (e.g., once every second).

In response to detecting that the current point of the fast-forwarding operation is within the second frequency threshold of the frame of interest, the media guidance application may restore the preview frequency to the initial preview frequency. For example, the media guidance application may restore the preview frequency (e.g., once every second) to the initial preview frequency (e.g., once every 5 seconds).

BRIEF DESCRIPTION OF THE FIGURES

The below and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for modifying a fast-forwarding speed based on a reaction time of a user when a frame of interest is detected. A media guidance application may receive a command from a user to fast-forward through a media asset. In response to receiving the command, the media guidance application may execute a fast-forwarding operation through frames of the media asset at a first speed. The media guidance application may detect that the fast-forwarding operation is approaching a frame of interest to the viewer. In response to detecting that the fast-forwarding operation is approaching the frame of interest, the media guidance application may reduce the fast-forwarding speed to a second speed slower than the first speed, where the second speed is determined based on an estimated reaction time of the user. The media guidance application may receive a command to resume playback from the user while the fast-forwarding operation is occurring at the second speed. Additionally, the media guidance application may play back the media asset at a default playback speed from a point corresponding to a moment when the command was received.

Although the below and above disclosure describes in detail systems and methods for modifying a fast-forwarding speed based on a reaction time of a user when a frame of interest is detected in relation to a fast-forward operation, the disclosure equally applies to a rewind operation scenario as well.

Figure 1:
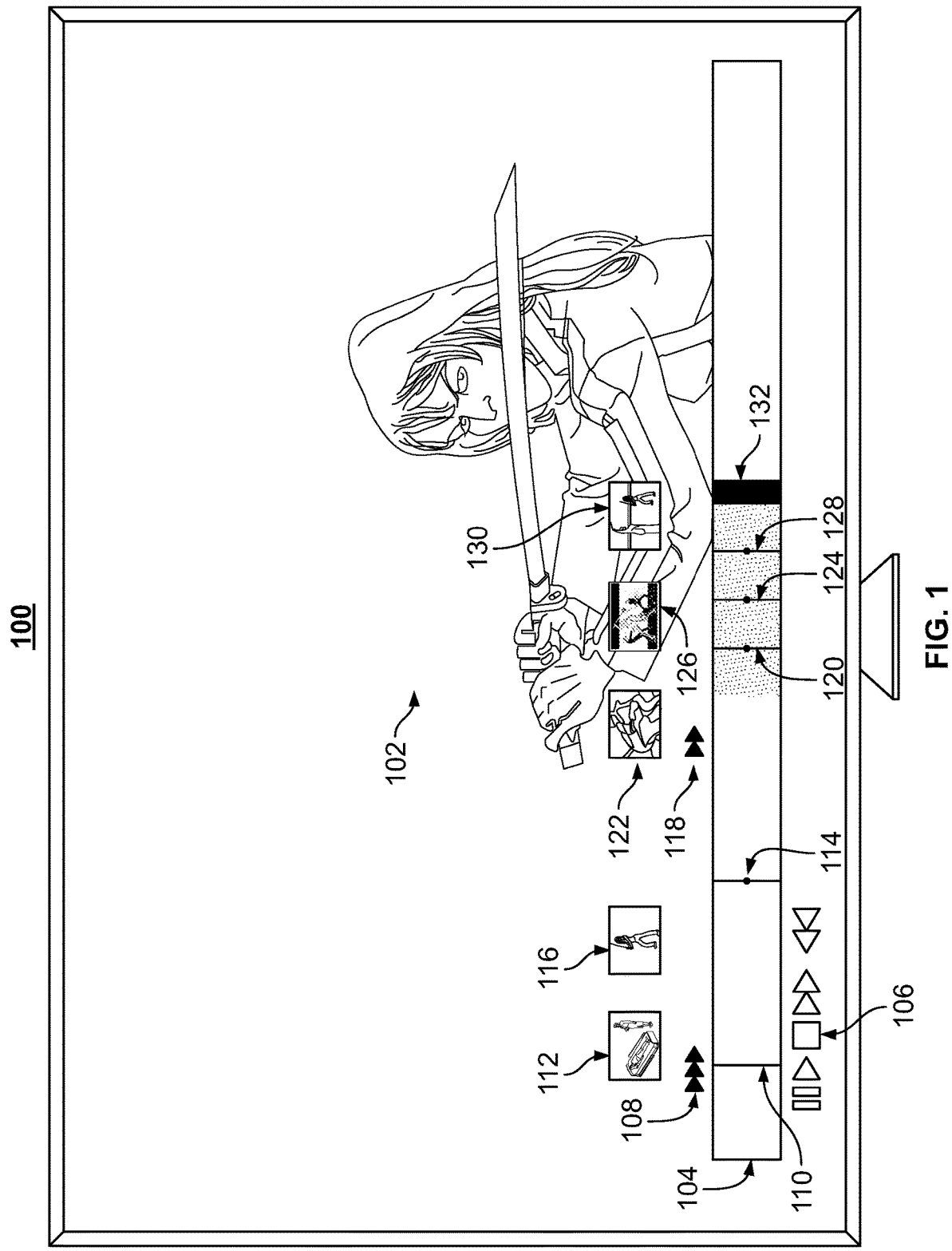
FIG. 1 shows an illustrative embodiment of modifying a fast-forwarding speed based on a reaction time of a user when a frame of interest is detected, in accordance with some embodiments of the disclosure.

FIG. 1 shows an illustrative embodiment of modifying a fast-forwarding speed based on a reaction time of a user when a frame of interest is detected, in accordance with some embodiments of the disclosure. FIG. 1 depicts user equipment 100, which may include control circuitry that executes a media guidance application on any user equipment. The functionality of user equipment, control circuitry, and the media guidance application is described in further detail below with respect to FIGS. 2-5.

The media guidance application may be playing back media asset 102 on user equipment 100. The media guidance application may generate for display trick play bar 104 over media asset 102; trick play bar 104 may contain trick play functionalities 106 (e.g., play, pause, stop, rewind, fast-forward, etc.). The media guidance application may receive a command from a user to fast-forward through a media asset. In response to receiving the command, the media guidance application may execute a fast-forwarding operation through frames of media asset 102 at first speed 108. At position 110 in playback, the media guidance application may generate for display overlay 112.

In some embodiments, the media guidance application may generate for display a frame corresponding to position 110 in playback in overlay 112. In some embodiments, the media guidance application may generate for display upcoming frame of interest 132 in overlay 112 corresponding to a frame from media asset 102. As referred to herein, a "frame of interest" refers to a frame or a segment of frames of media asset 102 that the media guidance application determines may be of interest to the user. For example, a frame of interest may be a scene in media asset 102 pivotal to the plot (e.g., Beatrix Kiddo receiving a Hattori Hanzo samurai sword in Kill Bill Vol. 1), or may be a scene with the user's favorite actor or actress in it (e.g., the first scene that features Lucy Liu, the user's favorite actress, in Kill Bill Vol. 1), etc.

At position 114 in playback, the media guidance application may generate for display overlay 116. The media guidance application may determine that position 114 is a preset amount of frames in the future from position 110. In some embodiments, the media guidance application may generate for display a frame corresponding to position 114 in playback in overlay 116. In some embodiments, the media guidance application may generate for display a frame in overlay 116 corresponding to upcoming frame of interest 132 from media asset 102.

In response to detecting that the fast-forwarding operation is approaching frame of interest 132, the media guidance application may reduce the fast-forwarding speed (e.g., first speed 108) to second speed 118. The media guidance application may determine that second speed 118 is slower than first speed 108. For example, the media guidance application may determine that first speed 108 is three times the normal playback speed and second speed 118 is one and a half times the normal playback speed.

At positions 120, 124, and 128 in playback, the media guidance application may generate for display overlays 122, 126, and 130, respectively. The media guidance application may determine that positions 120, 124, and 128 in playback are a set amount of frames apart from each other in playback (e.g., 100 frames apart from each other). The media guidance application may determine that position 128 is farther in the future than positions 124 and 120, and the media guidance application may determine that position 124 is farther in the future than position 120.

In some embodiments, the media guidance application may generate for display a frame corresponding to position 114 in playback in overlay 116. In some embodiments, the media guidance application may generate for display a different frame in each of overlays 122, 126 and 128 corresponding to positions 120, 124, and 128 respectively. The media guidance application may determine that each different frame in overlays 122, 126, and 128 corresponds to upcoming frame of interest 132 in playback of media asset 102.

In some embodiments, a media guidance application may receive a command from a user to fast-forward through a media asset. The media guidance application may determine that the received command corresponds to a fast-forward operation. For example, the media guidance application can determine, from interpreting an infrared signal sent from a remote control in response to the user pressing a button corresponding to a command, that the signal corresponds to the fast-forward command. For example, the media guidance application may receive a command from a user (e.g., the user selecting the "fast-forward" button on a remote controller) to fast-forward through a media asset (e.g., the movie, Kill Bill Volume 1). As another example, the media guidance application may receive a voice command from a user (e.g., a voice command from the user to fast-forward) to fast-forward through media asset 102. The media guidance application may process the voice command using an interactive voice system (e.g., the Amazon Alex, Siri, Google Home, etc.). Other manners in which the media guidance application receives commands from a user are described below in further detail with respect to FIGS. 2-5.

In some embodiments, when the media guidance application receives the command, the media guidance application may execute a fast-forwarding operation through frames of media asset 102 at first speed 108. The media guidance application may determine first speed 108 based on interpreting the user command. For example, the media guidance application may determine, from the number of times that the user presses the fast-forward button on a remote controller, first speed 108 (e.g., the fast-forward speed increases the more the user presses the fast-forward button).

The media guidance application may determine that the fast-forward speed may be either linearly or exponentially related to the number of times the user presses the fast-forward button on the remote controller. For example, the media guidance application may determine that the fast-forward speed is either linearly or exponentially related, based on a default setting for the remote and user equipment 100.

For example, the media guidance application may fast-forward through frames of media asset 102 (e.g., Kill Bill Volume 1) at first speed 108 (e.g., 3 times as fast (3×) as the normal speed (1×)) after determining that the user pressed the fast-forward button three times (e.g., the fast-forward speed is linearly related to the number of times the user presses the fast-forward button on the remote controller).

The media guidance application may detect that the fast-forwarding operation is approaching a frame of interest to the user. The media guidance application may determine that points of interest in media asset 102 are marked in the metadata of media asset 102, or accessible from a database that stores frames of interest and their corresponding positions in media asset 102. The media guidance application may determine that the frames of interest are editor-defined or user-defined, or a combination of the two.

In some embodiments, the media guidance application may determine that frames of interest are editor-defined. The media guidance application may retrieve metadata for media asset 102 from guidance data source 518. The media guidance application may determine, from the metadata, editor-defined frames of interest in media asset 102 (e.g., important scenes, famous scenes, etc.).

In some embodiments, the media guidance application may determine that frames of interest are expressly or implicitly user-defined. The media guidance application may determine the frames of interest from user preferences, crowdsourcing, the user's viewing history, or user-marked frames and segments, or any combination of the above.

For example, the media guidance application may determine the frames of interest from user preferences. The media guidance application may retrieve, from the profile, preferences for the user. For instance, the media guidance application may retrieve the user's favorite actors, characters in media asset 102, favorite genres, favorite scenes, etc. The media guidance application may compare the preferences for the user to metadata for media asset 102, and determine matches in the metadata with the user preferences (e.g., the metadata's actor field matches the user's favorite actor for three distinct scenes in media asset 102, and the frames in those scenes are marked as frames of interest).

As another example, the media guidance application may determine the frames of interest from crowdsourcing. The media guidance application may retrieve social media data corresponding to media asset 102 (e.g., using a web-crawler that locates instances on social media where the title of media asset 102 was mentioned). The media guidance application may determine, from the social media data, frames of interest in media asset 102. For example, the media guidance application may determine from the tone, content, and context of the social media data (e.g., a Tweet on the social media website Twitter stating, "The O-Ren Ishii and Beatrix Kiddo fight scene in Kill Bill is pivotal to the plot!"), frames of interest in media asset 102 (e.g., the O-Ren Ishii and Beatrix Kiddo fight scene in Kill Bill Volume 1). The media guidance application may determine the frames of interest in media asset 102 by comparing key words (e.g., "Kill Bill", "O-Ren Ishii", "Beatrix Kiddo", "fight", etc.) from the social media data with the metadata, and determining the frames corresponding to the metadata that matches the keywords.

As yet another example, the media guidance application may determine frames of interest from the user's viewing history. The media guidance application may retrieve the user's viewing history from the profile. The media guidance application may determine from the viewing history whether the user has previously watched media asset 102 (e.g., by determining if there is an entry for media asset 102 in the user's viewing history database). In response to determining that the user has previously watched media asset 102, the media guidance application may determine whether the user rewatched certain portions of media asset 102 multiple times (e.g., from the timestamp data in the viewing history database). In the event that the user rewatched certain portions of media asset 102 multiple times (e.g., the user rewatched the O-Ren Ishii and Beatrix Kiddo fight scene five times in a row), the media guidance application may tag the frames corresponding to the rewatched portions as frames of interest.

As another example, the media guidance application may determine frames of interest from user-marked frames and segments. The media guidance application may assign a command (e.g., a button on the remote) to tag a segment as frame of interest 132. For example, the media guidance application may assign the red button on the remote (e.g., which may be a default setting) to correspond to a command that tags a segment of media asset 102 as frame of interest 132. The media guidance application may detect the user pressing the red button a first time. At this point in playback, the media guidance application may tag the corresponding frame and all subsequent frames as frames of interest until the user presses the button a second time (e.g., the first pressing of the button begins the tagging and the second pressing of the button ends the tagging to create a segment of user-marked frames of interest).

The media guidance application may determine that the fast-forwarding operation is approaching frame of interest 132 to the viewer when frame of interest 132 is within a threshold number of frames, which may be a default number of frames determined by an editor, from the current frame in the fast-forwarding operation. The media guidance application may check each upcoming frame within the threshold number of frames to determine whether the frame is tagged as frame of interest 132.

For example, the media guidance application may detect that the fast-forwarding operation is approaching an editor-defined frame of interest by determining, from the metadata, that an editor-defined frame of interest is within a threshold number of frames from the current frame in the fast-forwarding operation (e.g., within 2400 frames).

In response to detecting that the fast-forwarding operation is approaching frame of interest 132, the media guidance application may reduce the fast-forwarding speed to second speed 118 slower than first speed 108. The media guidance application may reduce the fast-forwarding speed to second speed 118 slower than first speed 108 to allow the user more time to react when the user determines to resume playback at a specific point in the fast-forward operation. For example, when the media guidance application detects an approaching frame of interest, the media guidance application may reduce the fast-forwarding speed to second speed 118 (e.g., 1.5×) slower than first speed 108 (e.g., 3×). The media guidance application may calculate second speed 118 based on the user's reaction time.

In some embodiments, when determining second speed 118, the media guidance application may retrieve, from a profile for the user, a plurality of reaction times of the user. For example, the media guidance application may retrieve, from a profile for the user, a plurality of reaction times of the user (e.g., reaction times related to when the user resumes playback of media asset 102).

In some embodiments, when retrieving, from the profile for the user, the plurality of reaction times of the user, the media guidance application may retrieve, from a database, a plurality of data entries corresponding to rewind operations, where each rewind operation was initiated by the user within a predetermined time after the user issued an operation to resume playback during a fast-forward operation. The media guidance application may retrieve the predetermined time from the profile (e.g., from the user preferences). The media guidance application may determine that the predetermined time is editor-defined, and may be adjusted based on user input. For example, the media guidance application may retrieve, from a database that stores command histories, a plurality of data entries that correspond to rewind operations within a predetermined time retrieved from the user preference in the profile (e.g., the last two weeks of data entries).

In some embodiments, when retrieving, from the profile for the user, the plurality of reaction times of the user, the media guidance application may retrieve, from a database, a plurality of data entries corresponding to rewind operations, where each rewind operation was initiated by the user within a predetermined time after the user issued an operation to resume playback during a fast-forward operation. The media guidance application may retrieve, from the database, the plurality of data entries corresponding to rewind operations, based on the type of rewind operation (e.g., the user rewinding content with a remote controller, the user rewinding content based on a voice command, or a combination of the both). For example, if the user issued a voice command to fast-forward, the media guidance application may retrieve a plurality of data entries corresponding to rewind operations issued by voice commands from the user.

The media guidance application may determine, from a data entry in the plurality of data entries, a number of frames in a plurality of frames that the user rewinds through before resuming playback of media asset 102. The media guidance application may determine the number of frames that the user rewinds through before resuming playback by determining the total rewound time of playback of media asset 102 (e.g., calculated from the time stamps of the media asset from the time in playback of the start of the rewind to the time in playback when playback resumes). The media guidance application may retrieve the frame rate (e.g., frames per second (fps)) of media asset 102 from the metadata for media asset 102 (e.g., the frames per second may be 24 fps, 48 fps, 60 fps, etc.). The media guidance application may calculate from the fps for media asset 102 and the total rewind time of playback of media asset 102 the number of frames that the user rewinds through before resuming playback of media asset 102.

For example, the media guidance application may determine the number of frames that the user rewinds through by calculating the total time that the user rewinds media asset 102 in one instance of rewinding using time stamp data (e.g., rewound from 1 hour 45 min 50 sec to 1 hour 45 min 20 sec for a total of 30 seconds of playback time rewound). The media guidance application may retrieve the fps of media asset 102 (e.g., Kill Bill Vol. 1) from the metadata (e.g., 24 fps for Kill Bill Vol. 1). The media guidance application may calculate from the fps for media asset 102 (e.g., 24 fps) and the total rewound time of playback of media asset 102 (e.g., 30 seconds), the number of frames that the user rewinds through before resuming playback of media asset 102 (e.g., 24 fps×30 sec=720 frames).

The media guidance application may determine from the number of frames the plurality of reaction times. For example, the media guidance application may determine the plurality of reaction times from the number of frames by assigning each number of frames from a unique rewind operation to be a reaction time.

In some embodiments when the media guidance application calculates, from the reaction times, the estimated reaction time of the user, the media guidance application may determine, from a data entry corresponding to a command, a length of time of the rewind operation. The media guidance application may retrieve the data entry, from a command history database in the profile, a first-time stamp for the command corresponding to the user rewinding media asset 102 and a second-time stamp corresponding to the user resuming playback. The media guidance application may calculate the length of time of the rewind option from the first-time stamp and second-time stamp (e.g., by subtracting the first-time stamp from the second-time stamp). For example, the media guidance application may retrieve a data entry from the command history database corresponding to the rewind commands (e.g., the rewind command and the resume playback command). The media guidance application may determine from a first-time stamp for the command corresponding to the user rewinding media asset 102 (e.g., 10:45:30 (hour:min:sec)) and a second-time stamp for the command corresponding to the user resuming playback (e.g., 10:45:45 (hour:min:sec)) a length of time of the rewind (e.g., 10:45:45-10:45:30=15 seconds).

The media guidance application may calculate, from the number of frames and the length of time of the rewind operation, a reaction time of the user in a plurality of reaction times of the user. The media guidance application may retrieve the speed at which the user rewinds the content from the command history database in the profile. The media guidance application may calculate, using the number of frames and the length of time, the user chosen rewind speed. The media guidance application may calculate the rewind speed by dividing the number of frames by the fps of media asset 102 to determine the amount of playback time of media asset 102 that was rewound (e.g., dividing 240 frames by 24 fps resulting in 10 seconds of playback time). The media guidance application may then divide the playback time with the rewind time to determine the rewind speed (e.g., divide 10 seconds by 5 seconds of rewind time for a rewind speed of 2×). The media guidance application may determine that the reaction time is the playback time at a given rewind speed (e.g., 10 seconds at a rewind speed of 2×).

The media guidance application may determine, from the plurality of reaction times of the user, an average reaction time of the user, wherein the average reaction time is the estimated reaction time. The media guidance application may calculate the average reaction time of the user by summing the plurality of reaction times of the user and then dividing the result of the summation by the total number of reaction times. For example, the media guidance application may determine from the plurality of reaction times of the user (e.g., 1 second, 1.5 seconds, 2 seconds, 0.5 seconds, 1 second) and the plurality of rewind speeds (e.g., 3×, 2×, 5×, 1.5×, 1.5×) an average reaction time of the user (e.g., 1 second at 2.6× (the calculated average rewind speed)).

The media guidance application may calculate, from the reaction times, an estimated reaction time of the user. For example, the media guidance application may calculate the average reaction time of the user and determine that the estimated reaction time of the user is the average reaction time of the user. In some embodiments, the media guidance application may determine that the estimated reaction time of the user is influenced by the age of the user, or the time of day when the user is viewing playback of media asset 102, or any combination of the two.

In some embodiments, when the media guidance application is calculating, from the reaction times, the estimated reaction time of the user, the media guidance application may retrieve, from a profile for the user, a current age of the user. For example, the media guidance application may retrieve, from the profile for the user, the current age of the user (e.g., 75 years old).

The media guidance application may retrieve, from the profile, at least one reaction time of the user when an age of the user was the current age of the user. For example, the media guidance application may retrieve, from the profile, at least one reaction time (e.g., 3 seconds) when the age of the user was the current age of the user (e.g., 75 years old).

The media guidance application may adjust the reaction time of the user to an adjusted reaction time based on the current age of the user. The media guidance application may retrieve, from a database of adjustment data, an adjustment value corresponding to the current age of the user. The media guidance application may determine that the values within the adjustment data are defined by an editor, and may be adjusted via user input. For example, the media guidance application may retrieve, from a database of adjustment data, an adjustment value (e.g., 3 seconds) corresponding to the current age of the user (e.g., 75 years old). The media guidance application may adjust the reaction time of the user (e.g., 3 seconds at 2.5×) to an adjusted reaction time (e.g., 5 seconds at 2.5×) based on the current age of the user (e.g., 75 years old).

In some embodiments, the media guidance application may determine that the adjustment values increase as the user's age increase. For example, the media guidance application may determine that the editor-defined adjustment value for a 30-year-old user is zero seconds, while the editor-defined adjustment value for a 60-year-old user is 4 seconds.

The media guidance application may assign the adjusted reaction time to be the estimated reaction time of the user. The media guidance application may update the value of the estimated reaction time in the profile to be the adjusted reaction time. For example, the media guidance application may assign the adjusted reaction time to be the estimated reaction time (e.g., 5 seconds).

In some embodiments, when the media guidance application is calculating, from the reaction times, the estimated reaction time of the user, the media guidance application may determine a time when the command from the user to fast-forward through media asset 102 was received. For example, the media guidance application may determine the time (e.g., 11 pm) when the command from the user to fast-forward through media asset 102 was received.

The media guidance application may retrieve, from a database of times, where each time has a corresponding reaction time factor, a reaction time factor. In some embodiments, the media guidance application may determine that the reaction time factor may be editor-defined. For example, the media guidance application may retrieve, from a database of times, an editor-defined reaction time factor (e.g., a reaction time factor of 1.5× for 11 pm). In some embodiments, the media guidance application may determine that the reaction time factor may be editor-defined and dependent on the method of the command (e.g., from a remote controller, a voice command, or a combination of the both). For example, the media guidance application may retrieve, from a database of times, an editor-defined reaction time factor based on the method of the command (e.g., the user issued a voice command to fast-forward).

In some embodiments, the media guidance application may calculate the reaction time factor based on the user's command history. The media guidance application may retrieve reaction times of the user corresponding to the time of day (e.g., 11 pm) when the command from the user to fast-forward through media asset 102 was received. The media guidance application may compare the reaction times of the user corresponding to the time of day with the user's default reaction time (e.g., stored in the profile and may be the user's overall average reaction time). The media guidance application may determine that the difference between the user's time-of-day reaction times and the default reaction time is the reaction time factor.

The media guidance application may calculate, using the reaction time factor and the reaction times, a corresponding reaction time, where the corresponding reaction time is the estimated reaction time. For example, the media guidance application may calculate, using the reaction time factor (e.g., 1.5×) and the reaction times (e.g., 2 seconds), a corresponding reaction time (e.g., 3 seconds).

In response to calculating the estimated reaction time of the user, the media guidance application may determine second speed 118 from the estimated reaction time of the user. The media guidance application may retrieve, from an editor-defined speed database in the profile (e.g., a lookup table), second speed 118 that corresponds to the estimated reaction time of the user (e.g., the estimated reaction time at the average rewind speed). For example, the media guidance application may determine second speed 118 by retrieving, from the speed database in the profile, second speed 118 (e.g., 1.2×) that corresponds to the estimated reaction time of the user (e.g., 3 seconds at 2×). The media guidance application may determine that the editor-defined speed database is generated based on machine learning.

The media guidance application may receive a command to resume playback from the user while the fast-forwarding operation is occurring at second speed 118. For example, the media guidance application may receive a command to resume playback (e.g., the user presses the "play" button on a remote controller) from the user while the fast-forwarding operation is occurring at second speed 118.

In some embodiments, when the media guidance application receives the command to resume playback from the user while the fast-forwarding operation is occurring at second speed 118, the media guidance application may determine a threshold number of frames, wherein the threshold number of frames is a predetermined number of frames before frame of interest 132 to the viewer. For example, the media guidance application may determine the threshold number of frames (e.g., 100) based on the user's command history before frame of interest 132 to the viewer.

In some embodiments, the media guidance application may retrieve, from a command history database in the profile, the user's fast-forward command data near frames of interest. The media guidance application may determine instances of the user issuing a fast-forwarding command before a frame of interest. The media guidance application may determine that the threshold number of frames is the average number of frames from where the user issues a fast-forward command before a frame of interest.

The media guidance application may determine that the user does not send the command to resume playback within the threshold number of frames. For example, the media guidance application may determine that the user does not send the command to resume playback (e.g., the user does not press the "play" button on the remote controller) within the threshold number of frames (e.g., 100).

The media guidance application may increase the fast-forwarding speed from second speed 118 to first speed 108. For example, the media guidance application may increase the fast-forward speed from second speed 118 (e.g., 1.5×) to first speed 108 (e.g., 3×).

In some embodiments, the media guidance application may receive a command from the user that overrides the command to fast-forward at second speed 118. For example, the media guidance application may receive a command from the user that overrides the command to fast-forward at second speed 118 (e.g., the user presses the "fast-forward" button on the remote controller).

The media guidance application may determine, based on the override command, a third speed. The media guidance application may determine the third speed using similar methods as described above for determining first speed 108. For example, the media guidance application may determine, based on the override command (e.g., how many times the user has pressed the "fast-forward" button), a third speed (e.g., 2×).

The media guidance application may increase the fast-forwarding speed from second speed 118 to the third speed.

For example, the media guidance application may increase the fast-forwarding speed from second speed 118 (e.g., 1.5×) to the third speed (e.g., 2×).

In some embodiments, the media guidance application may generate an overlay (e.g., overlay 112, 116, 122, 126, or 130) to be displayed over a portion of media asset 102 containing a frame of media asset 102. The media guidance application may determine frames that help enhance the user's knowledge of media asset 102 and upcoming segments in playback.

In some embodiments, when the media guidance application reduces the fast-forwarding to second speed 118, the media guidance application may determine a threshold number of frames from a current frame, where the frame is a potential frame of interest. The media guidance application may retrieve the threshold number of frames from the current frame from the profile. The media guidance application may determine that the threshold number of frames from the current frame is an editor-defined value. For example, the media guidance application may determine a threshold number of frames (e.g., 100 frames) from a current frame, where the frame is a potential frame of interest (e.g., a frame showing an action scene in Kill Bill Volume 1).

The media guidance application may generate for display the potential frame of interest within an overlay (e.g., overlay 112, 116, 122, 126, or 130) on top of media asset 102. For example, the media guidance application may generate for display the potential frame of interest (e.g., the frame showing an action scene in Kill Bill Volume 1) within an overlay on top of media asset 102 (e.g., an overlay on top of the Kill Bill Volume 1 movie). The media guidance application may determine the potential frame of interest from preferences for the user and metadata for media asset 102.

In some embodiments, the media guidance application may retrieve, from the profile, preferences for the user. For example, the media guidance application may retrieve, from the profile, preferences for the user (e.g., the user's favorite genres, actors/actresses, social media preferences, etc.).

The media guidance application may determine, from metadata for at least one frame within a plurality of frames, characteristics of the frame. For example, the media guidance application may determine characteristics of the frame from the metadata (e.g., title, genre, etc.) of the frame.

The media guidance application may compare the characteristics of the at least one frame with the preferences for the user. For example, the media guidance application may compare the characteristics of the at least one frame (e.g., actors/actresses in the frame, genre, scene, etc.) with the preferences for the user (e.g., user's favorite actors/actresses).

The media guidance application may determine, from the comparison, the potential frame of interest. The media guidance application may determine that the potential frame of interest are frames where the preferences for the user are found in the metadata. For example, the media guidance application may determine that the frame that contains the user's favorite actress (e.g., Lucy Liu) is the potential frame of interest.

The media guidance application may generate for display a preview overlay (e.g., overlay 112, 116, 122, 126, 130) over media asset 102. For example, the media guidance application may generate for display a preview overlay (e.g., an overlay displaying an image over the middle of media asset 102 being displayed) over media asset 102 (e.g., Kill Bill Vol. 1).

The media guidance application may generate for display, in the preview overlay (e.g., overlay 112, 116, 122, 126, 130), frames later in time than a current point of the fast-forwarding operation, where the frames in the preview overlay are updated according to a preview frequency that is set to an initial preview frequency. The media guidance application may retrieve the initial preview frequency from the profile, where the initial preview frequency is a default value defined by an editor that may be updated via user input.

In some embodiments, the media guidance application may determine that the frames later in time are potential frames of interest, as described above. In some embodiments, the media guidance application may determine that the frames later in time are always a preset (e.g., editor-defined) number of frames ahead of the current frame (e.g., always 100 frames ahead).

For example, the media guidance application may generate for display, in the preview overlay (e.g., overlay 112, 116, 122, 126, 130), frames (e.g., potential frames of interest) later in time (e.g., the Crazy 88 fight scene) than a current point of the fast-forward operation (e.g., the Bride waking up from her coma), wherein the frames in the preview overlay are updated according to a preview frequency (e.g., once every 5 seconds) that is set to an initial preview frequency (e.g., once every 5 seconds).

The media guidance application may detect that the current point of the fast-forwarding operation is within a first frequency threshold of frame of interest 132 (e.g., positions 120, 124, 128). The media guidance application may retrieve the first frequency threshold from the profile, where the first frequency threshold is a default value defined by an editor that may be updated via user input. For example, the media guidance application may detect that the current point of the fast-forwarding operation is within a first frequency threshold (e.g., within 2 minutes) of the frame of interest.

In response to detecting that the current point of the fast-forwarding operation is within the first frequency threshold of frame of interest 132, the media guidance application may adjust the preview frequency so that frames in the preview overlay are changed more often than when at the initial preview frequency (e.g., at positions 110 and 114). For example, the media guidance application may adjust the preview frequency so that frames in the preview overlay are changed more often (e.g., once every second at positions 120, 124, and 128) than when at the initial preview frequency (e.g., once every 5 seconds at positions 110 and 114).

The media guidance application may detect that the current point of the fast-forwarding operation is within a second frequency threshold of frame of interest 132. The media guidance application may determine that the second frequency threshold is a default value defined by an editor that may be updated via user input. For example, the media guidance application may detect that the current point of the fast-forwarding operation is within a second frequency threshold of frame of interest 132 (e.g., within 10 seconds).

In response to detecting that the current point of the fast-forwarding operation is within the second frequency threshold of frame of interest 132, the media guidance application may restore the preview frequency to the initial preview frequency. For example, the media guidance application may restore the preview frequency (e.g., once every second) to the initial preview frequency (e.g., once every 5 seconds).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
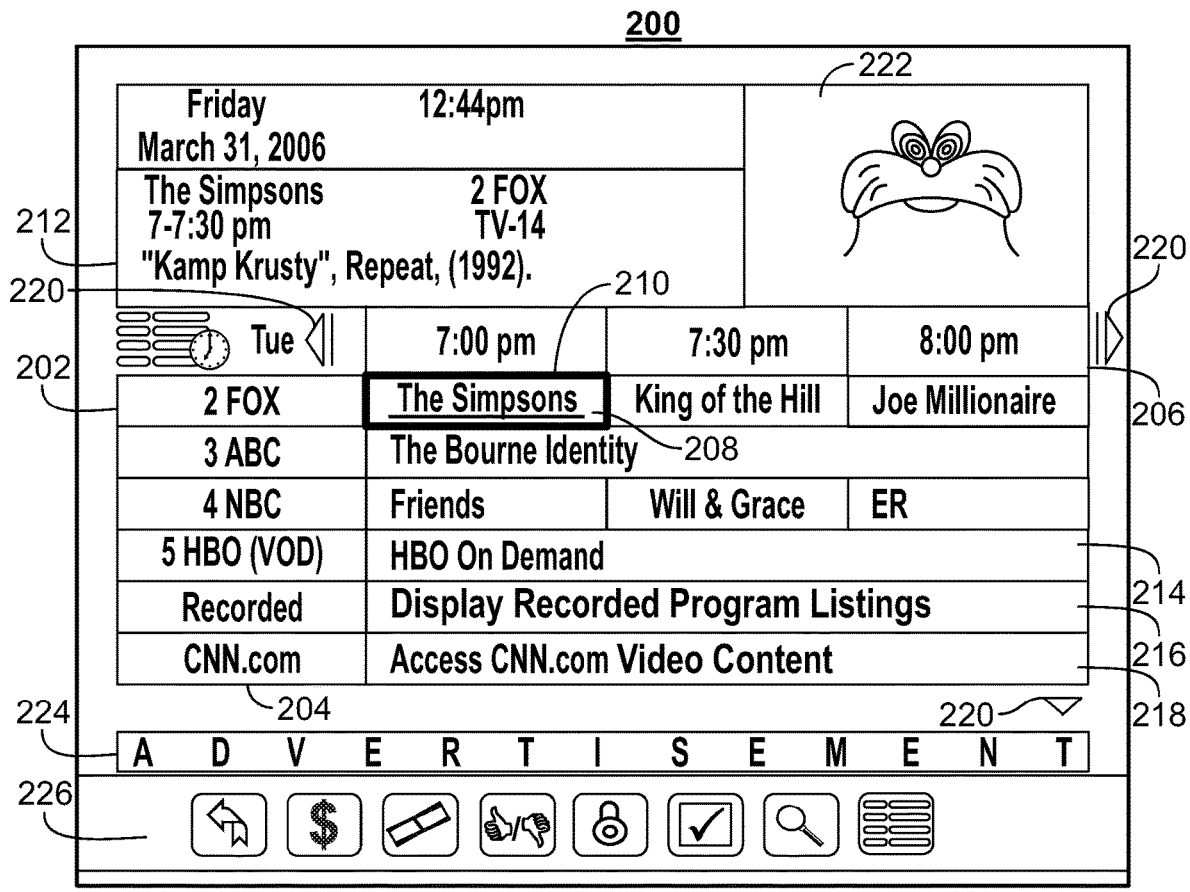
FIG. 2 shows an illustrative embodiment of a display screen that may be used to provide media guidance application listings and other media guidance information, in accordance with some embodiments of the disclosure.
Figure 3:
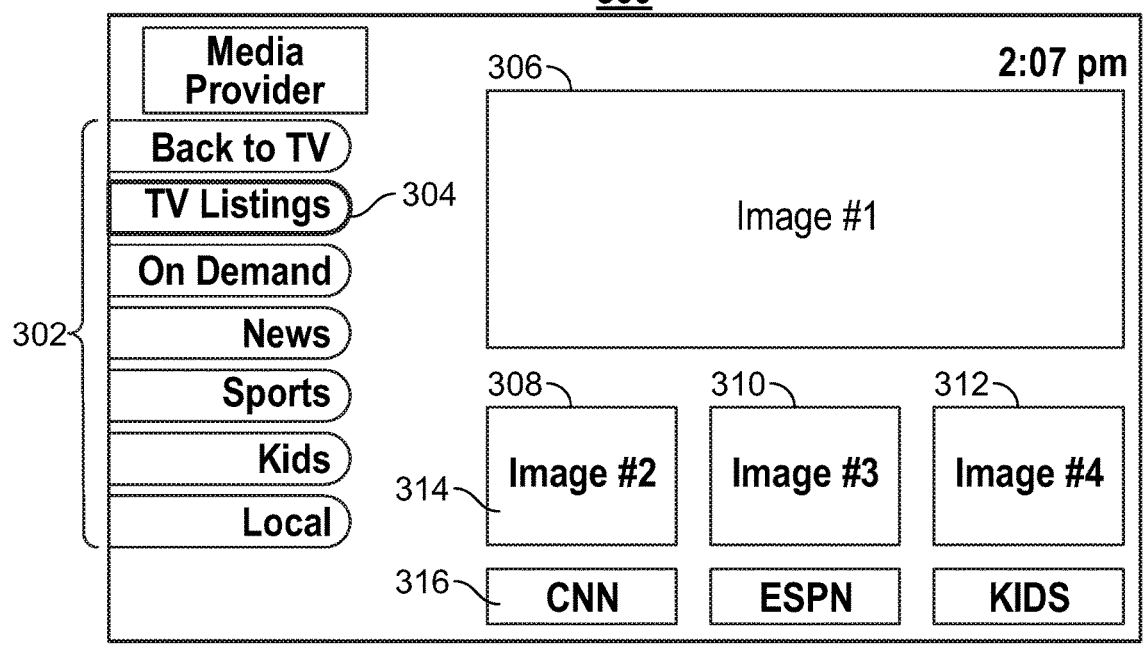
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
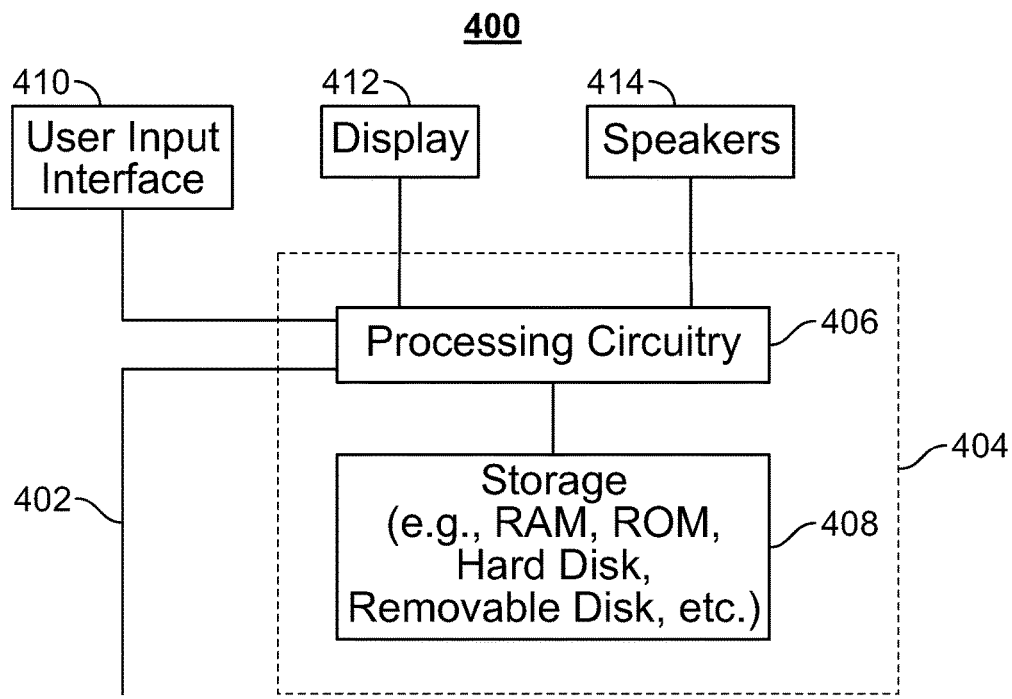
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may generate for display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
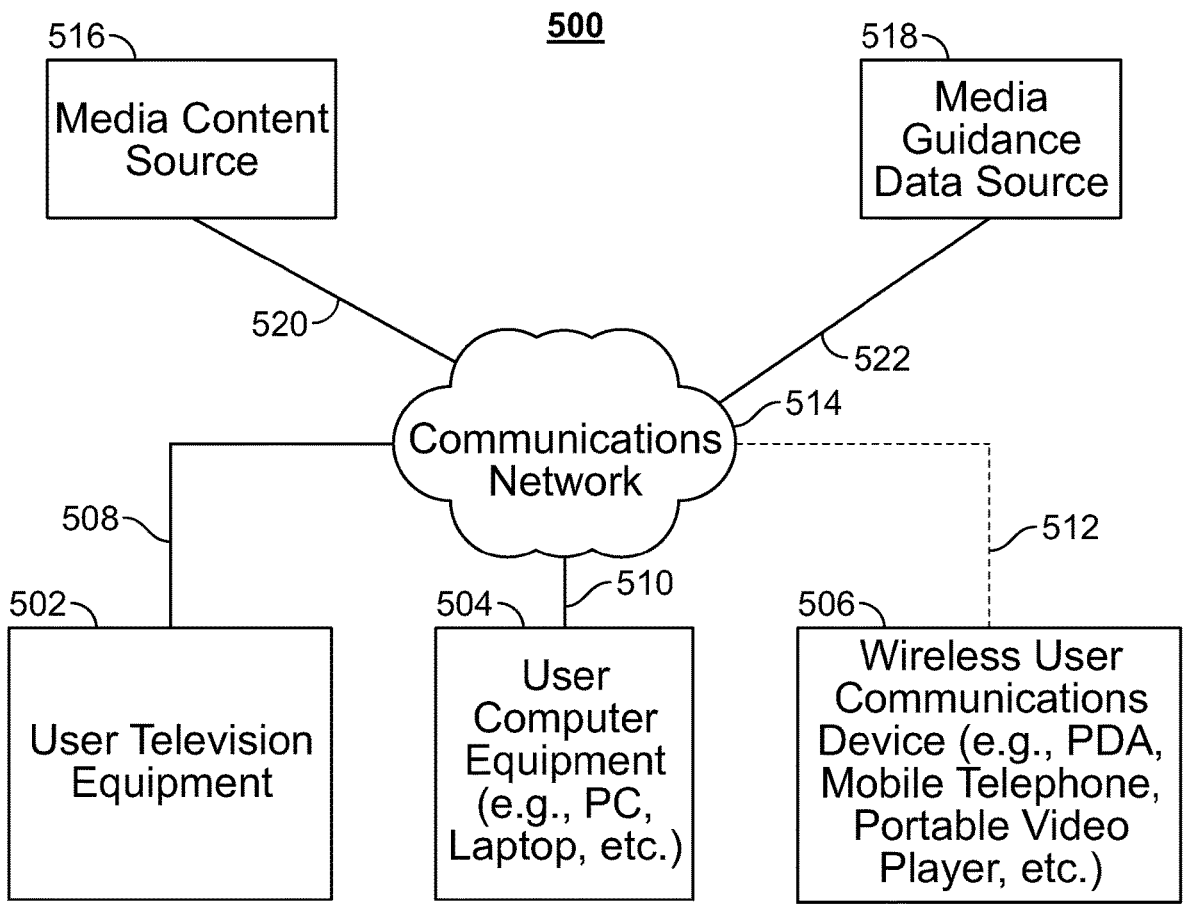
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
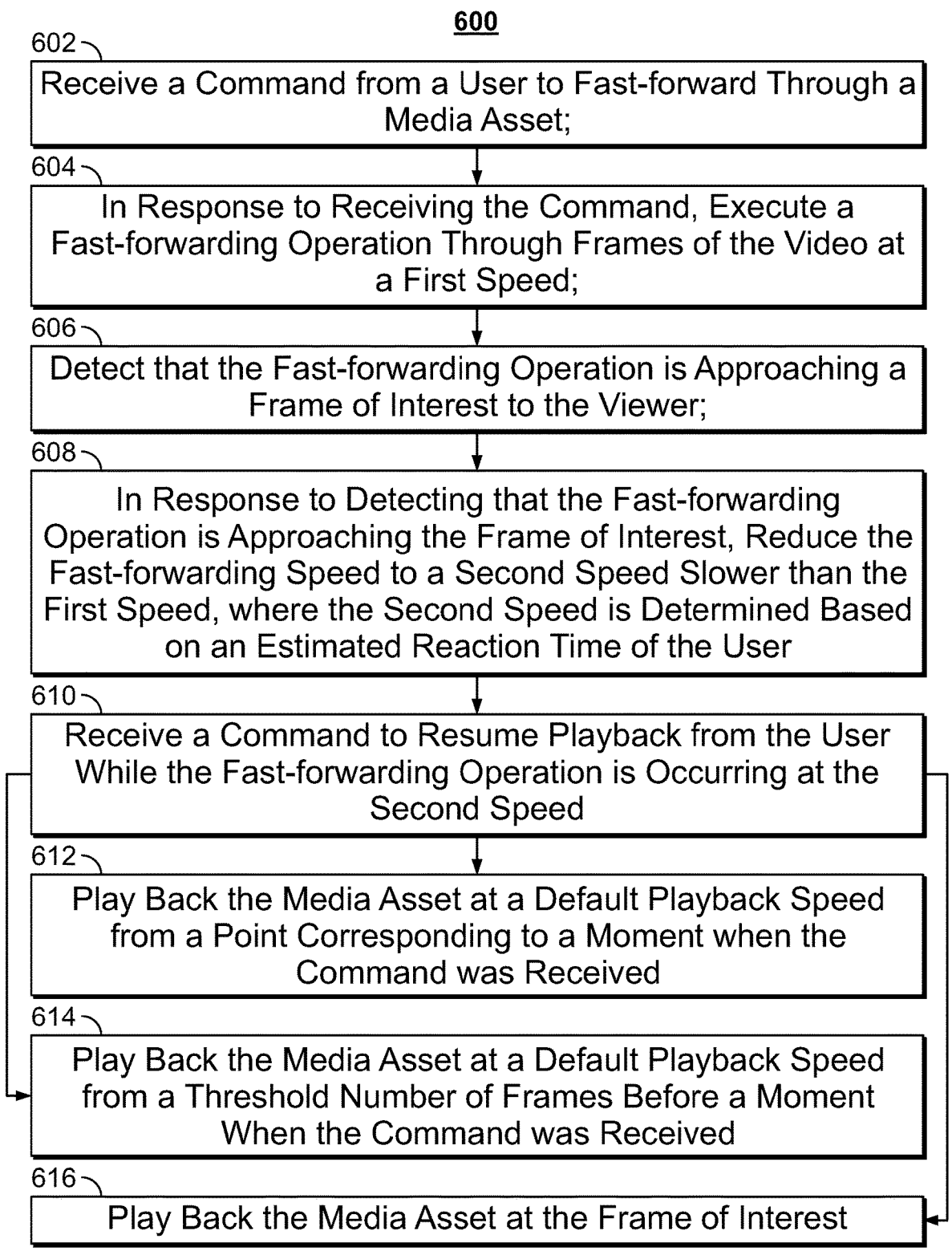
FIG. 6 depicts an illustrative flowchart of a process for modifying a fast-forwarding speed based on a reaction time of a user when a frame of interest is detected, in accordance with some embodiments of the disclosure.

FIG. 6 depicts an illustrative flowchart of a process for modifying a fast-forwarding speed based on a reaction time of a user when a frame of interest is detected, in accordance with some embodiments of the disclosure. Process 600, and any of the following processes, may be executed by control circuitry 404 (e.g., in a manner instructed to control circuitry 404 by the media guidance application). Control circuitry 404 may be part of user equipment (e.g., user equipment 100, which may have any, or all of the functionality of user television equipment 502, user computer equipment 504, and/or wireless communications device 506), or of a remote server separated from the user equipment by way of communication network 514, or distributed over a combination of both.

At 602, control circuitry 404 receives a command from a user to fast-forward through a media asset. Control circuitry 404 may receive the command from the user to fast-forward through media asset 102 from user input interface 410. For example, control circuitry 404 may receive a command from the user to fast-forward through media asset 102 from user input interface 410 via user television equipment 502 (e.g., a remote controller). At 604, in response to receiving the command, control circuitry 404 executes a fast-forwarding operation through frames of the video at a first speed. For example, control circuitry 404 may use processing circuitry 406 to fast-forward through playback at a rate faster than normal playback.

At 606, control circuitry 404 detects that the fast-forwarding operation is approaching a frame of interest to the viewer. Control circuitry 404 detects the fast-forwarding operation using similar detection methods as described above. For example, control circuitry 404 may receive metadata containing tags corresponding to frames of interest from media guidance data source 518. Control circuitry 404 may determine, from the metadata, that the fast-forward operation is approaching a frame of interest.

At 608, in response to detecting that the fast-forwarding operation is approaching the frame of interest, control circuitry 404 reduces the fast-forwarding speed to a second speed slower than the first speed, where the second speed is determined based on an estimated reaction time of the user. Control circuitry 404 determines the second speed in a similar manner as described above. For example, control circuitry 404 may retrieve the second speed from a database from storage 408 or a server via communications network 514.

At 610, control circuitry 404 receives a command to resume playback from the user while the fast-forwarding operation is occurring at the second speed. Control circuitry 404 may receive the command from the user to fast-forward through media asset 102 from user input interface 410. For example, control circuitry 404 may receive a command from the user to resume playback of media asset 102 from user input interface 410 via user television equipment 502 (e.g., a remote controller).

At 612, control circuitry 404 plays back media asset 102 at a default playback speed from a point corresponding to a moment when the command was received. For example, control circuitry 404 may play back the media asset 102 at a default playback speed (e.g., at the corresponding fps determined from the metadata).

At 614, control circuitry 404 plays back media asset 102 at a default playback speed from a threshold number of frames before a moment when the command was received. Control circuitry 404 retrieves the threshold number of frames from a profile from storage 408 or a server via communications network 514. Control circuitry 404 determines that the threshold number of frames is editor-defined, or calculated using similar methods as described above.

At 616, control circuitry 404 plays back media asset 102 at the frame of interest. For example, control circuitry 404 may play back media asset 102 at the frame of interest (e.g., 30 frames ahead of the current frame).

Figure 7:
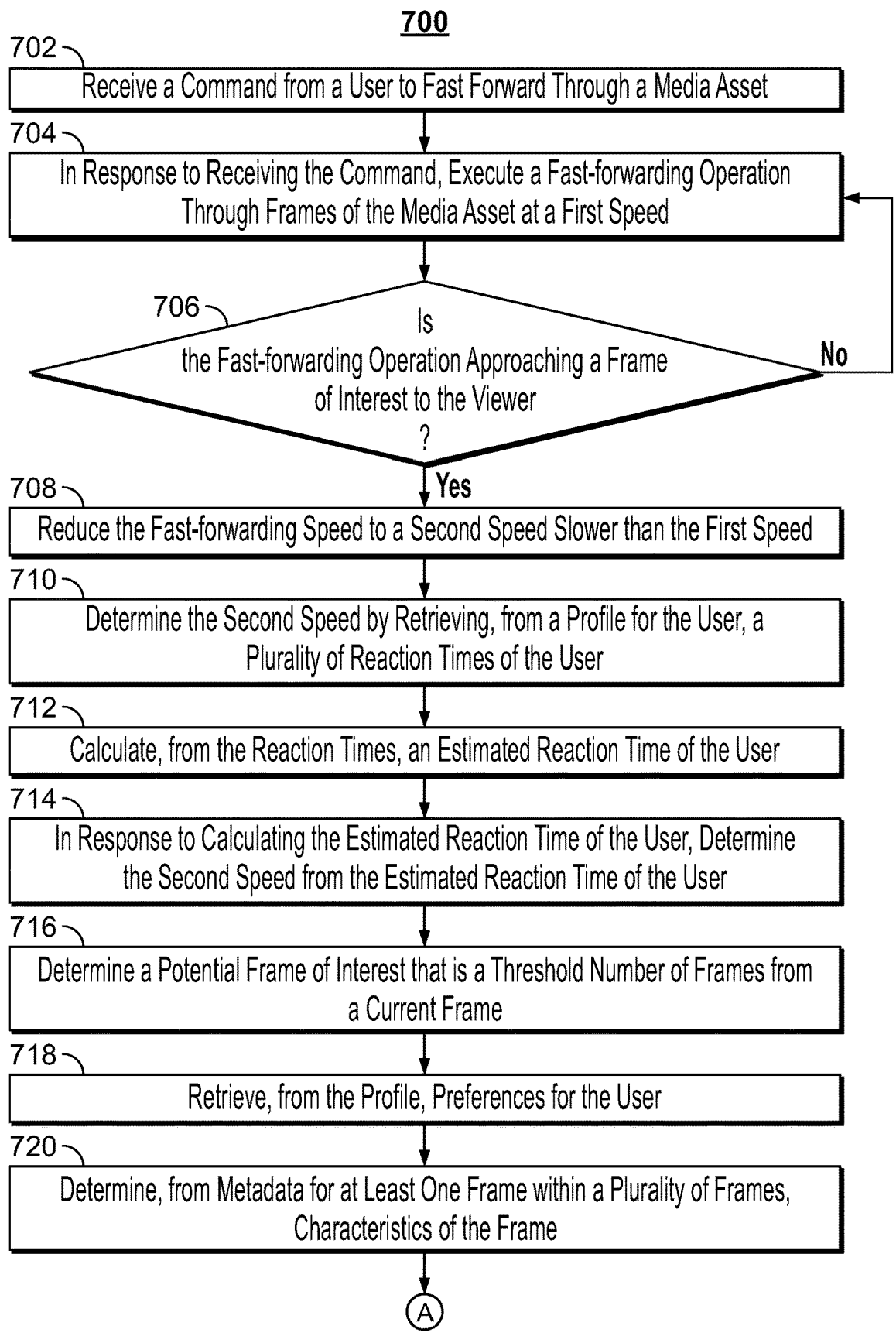
FIG. 7 depicts an illustrative flowchart of a process for modifying a fast-forwarding speed based on a reaction time of a user when a frame of interest is detected, in accordance with some embodiments of the disclosure.
Figure 7:
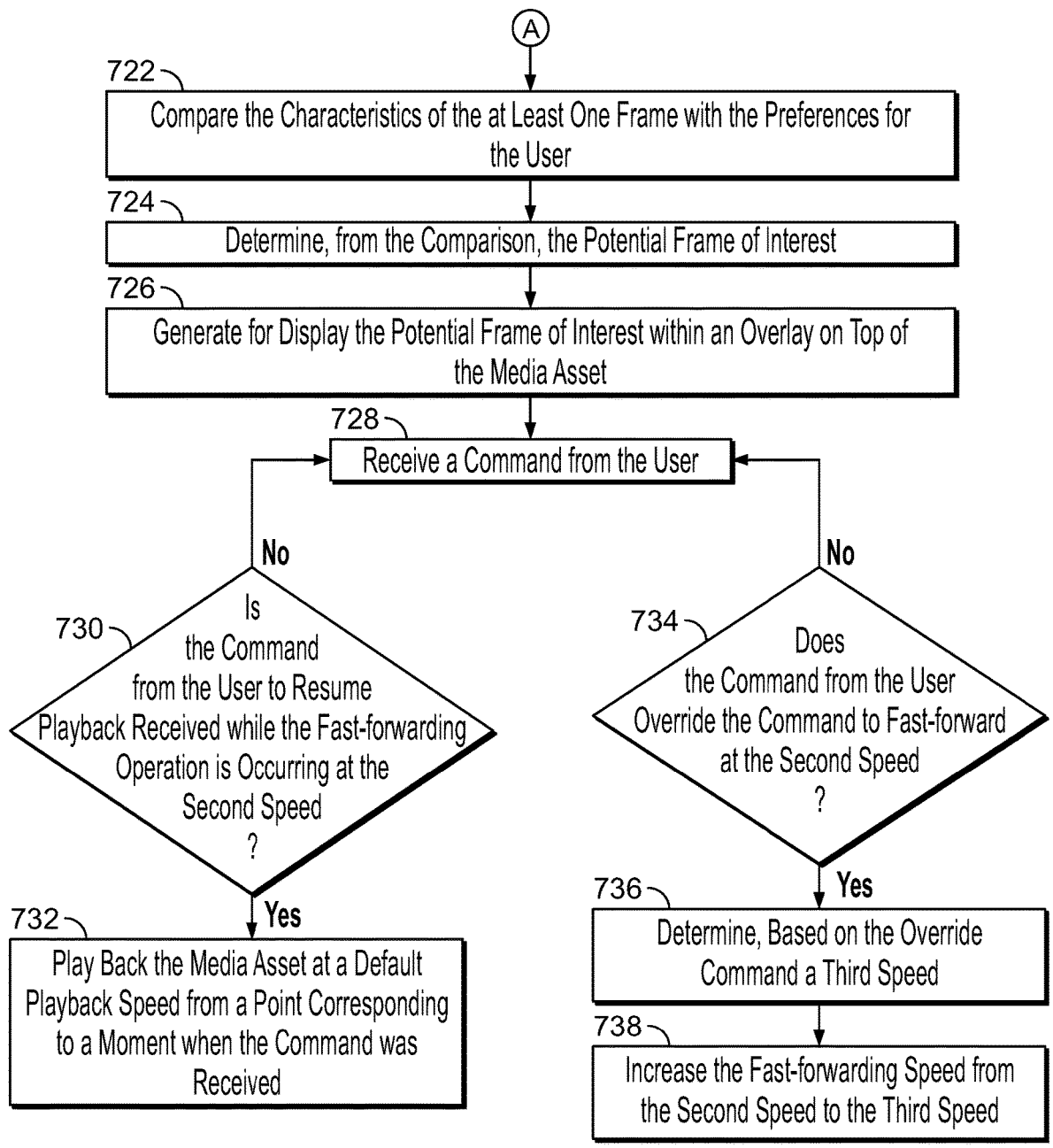

FIG. 7 depicts an illustrative flowchart of a process for modifying a fast-forwarding speed based on a reaction time of a user when a frame of interest is detected, in accordance with some embodiments of the disclosure. At 702, control circuitry 404 receives a command from a user to fast-forward through a media asset. Control circuitry 404 may receive the command from the user to fast-forward through media asset 102 from user input interface 410. For example, control circuitry 404 may receive a command from the user to fast-forward through media asset 102 from user input interface 410 via user television equipment 502 (e.g., a remote controller).

At 704, in response to receiving the command, control circuitry 404 executes a fast-forwarding operation through frames of media asset 102 at first speed 108. For example, control circuitry 404 may execute a fast-forward operation through frames of media asset 102 using processing circuitry 406. At 706, control circuitry 404 determines whether the fast-forwarding operation is approaching a frame of interest to the viewer. Control circuitry 404 determines whether the fast-forwarding operation is approaching a frame of interest to the viewer using similar methods as described above.

If, at 706, control circuitry 404 determines that "No," the fast-forwarding operation is not approaching a frame of interest, then process 706 reverts to process 704.

If, at 706, control circuitry 404 determines that "Yes," the fast-forwarding operation is approaching a frame of interest, then process 706 reverts to process 708. At 708, control circuitry 404 reduces the fast-forwarding speed to second speed 118 slower than first speed 108. For example, control circuitry 404 may reduce the fast-forwarding speed to a second speed (e.g., 1.5×) slower than the first speed (e.g., 3×).

At 710, control circuitry 404 determines second speed 118 by retrieving, from a profile for the user, a plurality of reaction times of the user. Control circuitry 404 retrieves the plurality of reaction times for a profile stored in storage 408, or on a remote server via communications network 514. For example, control circuitry 404 retrieves, from the profile stored in storage 408, a plurality of reaction times of the user.

At 712, control circuitry 404 calculates, from the reaction times, an estimated reaction time of the user. For example, control circuitry 404 uses processing circuitry 406 to calculate the estimated reaction time of the user, using the methods described in detail above. At 714, in response to calculating the estimated reaction time of the user, control circuitry 404 determines second speed 118 from the estimated reaction time of the user. Control circuitry 404 retrieves, from a database (e.g., a lookup table) in storage 408 or from a remote server via communications network 514, second speed 118 that corresponds to the estimated reaction time of the user.

At 716, control circuitry 404 determines a potential frame of interest that is a threshold number of frames from a current frame. Control circuitry 404 determines the potential frame of interest from preferences for the user retrieved from the user profile (e.g., stored in storage 408 or a remote server and accessed via communications network 514) and metadata for media asset 102 retrieved from media guidance data source 518.

At 718, control circuitry 404 retrieves, from the profile, preferences for the user. For example, control circuitry 404 may retrieve preferences for the user stored in storage 408 or a remote server and accessed via communications network 514. At 720, control circuitry 404 determines, from metadata for at least one frame within a plurality of frames, characteristics of the frame. For example, control circuitry 404 may determine the characteristics of the frame (e.g., actors/actress present, genre, etc.) by processing the metadata with processing circuitry 406.

At 722, control circuitry 404 may compare the characteristics of the at least one frame with the preferences for the user. For example, control circuitry 404 may compare the characteristics of the at least one frame (e.g., actors/actress present in the frame, plot associated with the frame, genre, etc.) with the preference for the user (e.g., the user's favorite actor/actress, favorite genre, favorite plot in media asset 102, etc.). At 724, control circuitry 404 determines, from the comparison, the potential frame of interest. For example, control circuitry 404 may determine, from the comparison, the potential frame of interest using similar methods as described above (e.g., a frame that has the user's favorite actress in it).

At 726, control circuitry 404 generates for display the potential frame of interest within an overlay (e.g., overlays 112, 116, 122, 126, or 130 on top of media asset 102). Control circuitry 404 generates the overlay on display 412 of user television equipment 502. At 728, control circuitry 404 receives a command from the user. Control circuitry 404 may receive the command from user input interface 410. For example, control circuitry 404 may receive a command from the user to fast-forward through media asset 102 from user input interface 410 via user television equipment 502 (e.g., a remote controller).

At 730, control circuitry 404 determines whether the command from the user to resume playback is received while the fast-forwarding operation is occurring at the second speed.

If, at 730, control circuitry 404 determines that "No," the command from the user to resume playback is received while the fast-forwarding operation is occurring at the second speed, process 730 reverts to process 728. If, at 730, control circuitry 404 determines that "Yes," the command from the user to resume playback is received while the fast-forwarding operation is occurring at the second speed, process 730 proceeds to process 732. At 732, control circuitry 404 plays back media asset 102 at a default playback speed from a point corresponding to a moment when the command was received. For example, control circuitry 404 plays back the media asset at a default playback speed (e.g., 24 fps) from a point corresponding to a moment when the command was received (e.g., from user input interface 410).

At 734, control circuitry 404 determines whether the command from the user overrides the command to fast-forward at second speed 118. For example, control circuitry 404 may determine whether the command from the user overrides the command to fast-forward at second speed 118 by determining whether the command corresponds to a fast-forward command received from user input interface 410.

If, at 734, control circuitry 404 determines that "No," the command from the user does not override the command to fast-forward at the second speed, then process 734 reverts to process 728. If, at 734, control circuitry 404 determines that "Yes," the command from the user does override the command to fast-forward at the second speed, then process 734 proceeds to process 736. At 736, control circuitry 404 determines, based on the override command, a third speed. For example, control circuitry 404 may determine, based on the override command (e.g., a fast-forward command via user input interface 410), a third speed (e.g., 3× the normal speed). Control circuitry 404 determines the third speed using similar methods as described above. At 738, control circuitry 404 increases the fast-forwarding speed from the second speed to the third speed. For example, control circuitry 404 may increase the fast-forward speed from the second speed (e.g., 1.5×) to the third speed (e.g., 3×).

Figure 8:
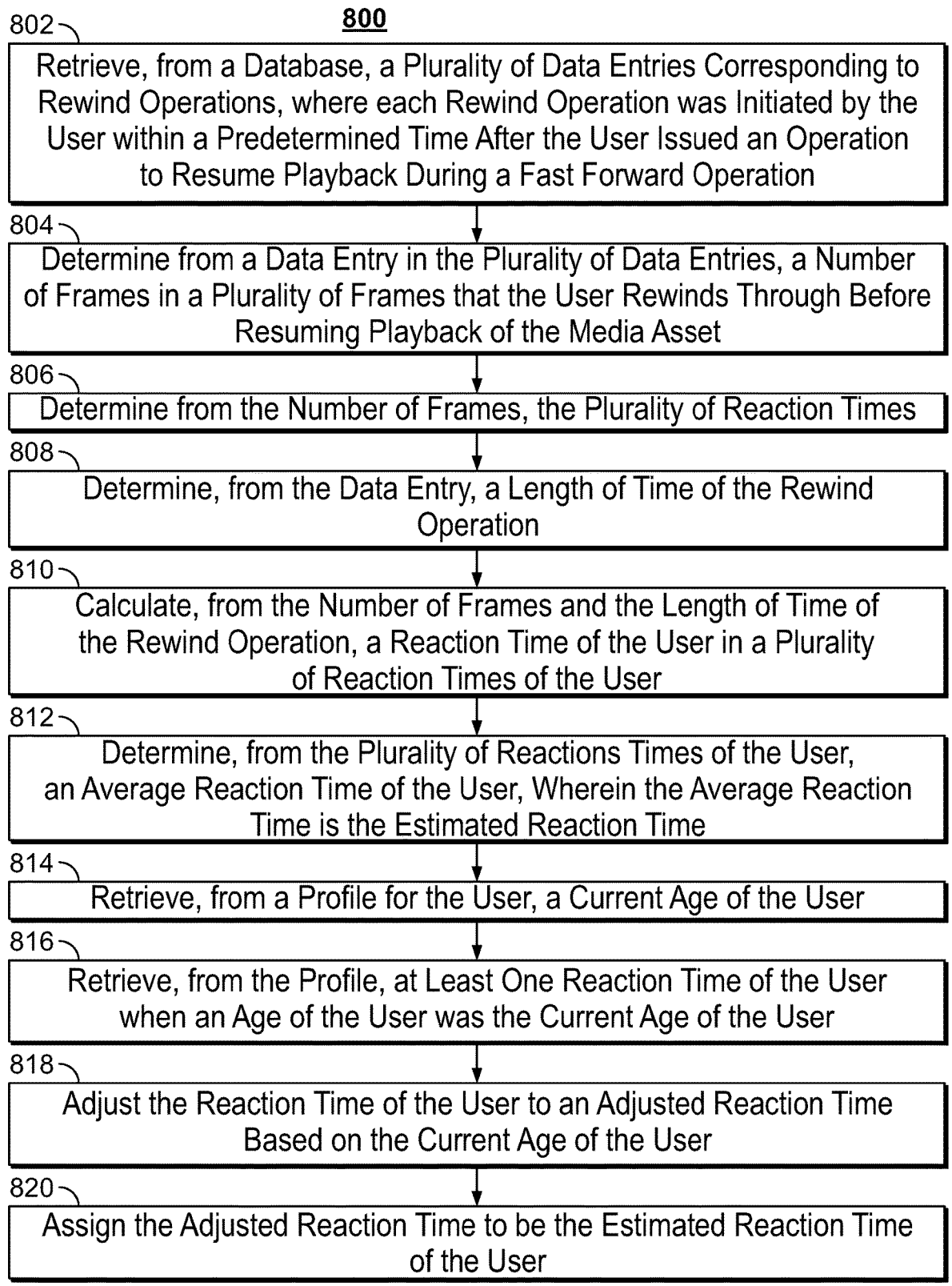
FIG. 8 depicts an illustrative flowchart of a process for retrieving, from the profile for the user, the plurality of reaction times of the user, in accordance with some embodiments of the disclosure.

FIG. 8 depicts an illustrative flowchart of a process for retrieving, from the profile for the user, the plurality of reaction times of the user, in accordance with some embodiments of the disclosure.

At 802, control circuitry 404 retrieves, from a database, a plurality of data entries corresponding to rewind operations, where each rewind operation was initiated by the user within a predetermined time after the user issued an operation to resume playback during a fast-forward operation. Control circuitry 404 retrieves the database from storage 408 or from a remote server via network communications 514.

At 804, control circuitry 404, determines from a data entry in the plurality of data entries, a number of frames in a plurality of frames that the user rewinds through before resuming playback of media asset 102. Control circuitry 404 determines the number of frames that the user rewinds through before resuming playback of media asset 102 using similar methods as described above. For example, control circuitry 404 may determine the number of frames that the user rewinds through before resuming playback (e.g., 240 frames). At 806, control circuitry 404 determines from the number of frames the plurality of reaction times. Control circuitry 404 determines the plurality of reaction times from the number of frames using similar methods as described above.

At 808, control circuitry 404 determines, from the data entry, a length of time of the rewind operation. Control circuitry 404 calculates, using processing circuitry 406, from the data entry, the length of time of the rewind operation. For example, control circuitry 404 calculates, using processing circuitry 406, from the time stamps corresponding to the rewind command and the resume playback command, the length of time of the rewind operation, as described in detail above. At 810, control circuitry 404 calculates, from the number of frames and the length of time of the rewind operation, a reaction time of the user in a plurality of reaction times of the user. Control circuitry 404 calculates the reaction time of the user using similar methods as described above.

At 812, control circuitry 404 determines, from the plurality of reaction times of the user, an average reaction time of the user, wherein the average reaction time is the estimated reaction time. Control circuitry 404 calculates the average reaction time of the user from the plurality of reaction times using processing circuitry 406. At 814, control circuitry 404 retrieves, from a profile for the user, a current age of the user. Control circuitry retrieves the current age of the user from the profile stored in storage 406 or from a remote server via communications network 514. For example, control circuitry 404 may retrieve the user's age (e.g., 75 years old) from the profile in storage 406.

At 816, control circuitry 404 retrieves, from the profile, at least one reaction time of the user when an age of the user was the current age of the user. Control circuitry retrieves the at least one reaction time of the user when an age of the user was the current age of the user from the profile stored in storage 406 or from a remote server via communications network 514. For example, control circuitry 404 may retrieve from storage 406 the at least one reaction time of the user corresponding to the user's current age.

At 818, control circuitry 404 adjusts the reaction time of the user to an adjusted reaction time based on the current age of the user. Control circuitry 404 adjusts the reaction time of the user to the adjusted reaction time based on the current age using the methods described above. At 820, control circuitry 404 assigns the adjusted reaction time to be the estimated reaction time of the user. For example, control circuitry 404 may save the adjusted reaction time as the estimated reaction time in storage 408 or on a remote server via communications network 514.

Figure 9:
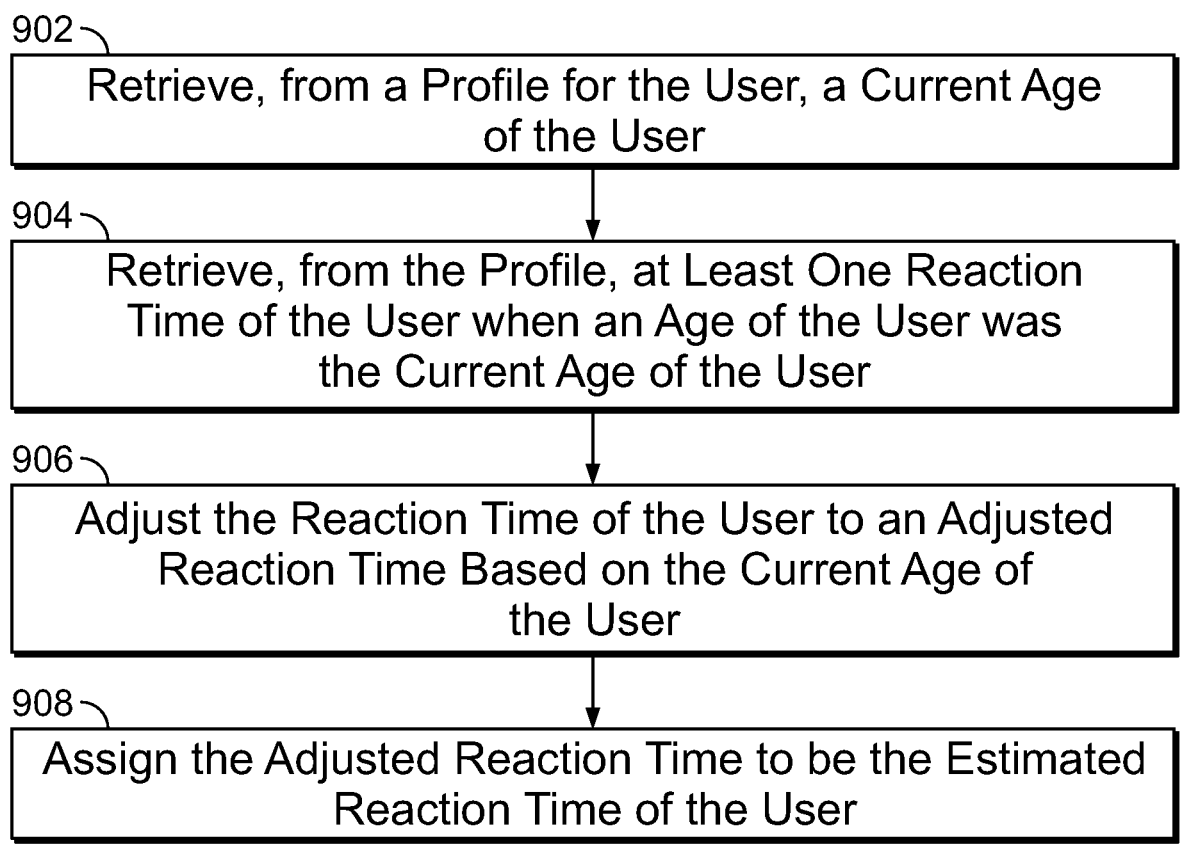
FIG. 9 depicts an illustrative flowchart of a process for calculating, from the reaction times, the estimated reaction time, in accordance with some embodiments of the disclosure.

FIG. 9 depicts an illustrative flowchart of a process for calculating, from the reaction times, the estimated reaction time, in accordance with some embodiments of the disclosure. At 902, control circuitry 404 retrieves, from a profile for the user, a current age of the user. Control circuitry 404 retrieves the current age of the user from the profile stored in storage 408, or from a remote server accessed via communications network 514. At 904, control circuitry 404 retrieves, from the profile, at least one reaction time of the user when an age of the user was the current age of the user. Control circuitry 404 retrieves the reaction time of the user from the profile stored in storage 408, or from a remote server accessed via communications network 514. For example, control circuitry 404 may retrieve the reaction time of the user (e.g., 10 seconds at 2× speed) from the profile stored on a remote server via communications network 514.

At 906, control circuitry 404 adjusts the reaction time of the user to an adjusted reaction time based on the current age of the user. Control circuitry 404 retrieves the adjustment factor from a database store in storage 408, or from a remote server accessed via communications network 514. Control circuitry calculates, using processing circuitry 406, the adjusted reaction time using the adjustment factor, as described in detail above. At 908, control circuitry 404 assigns the adjusted reaction time to be the estimated reaction time of the user. Control circuitry 404 saves the adjusted reaction time as the estimated reaction time in the profile in storage 408 or on a remote server via communications network 514.

Figure 10:
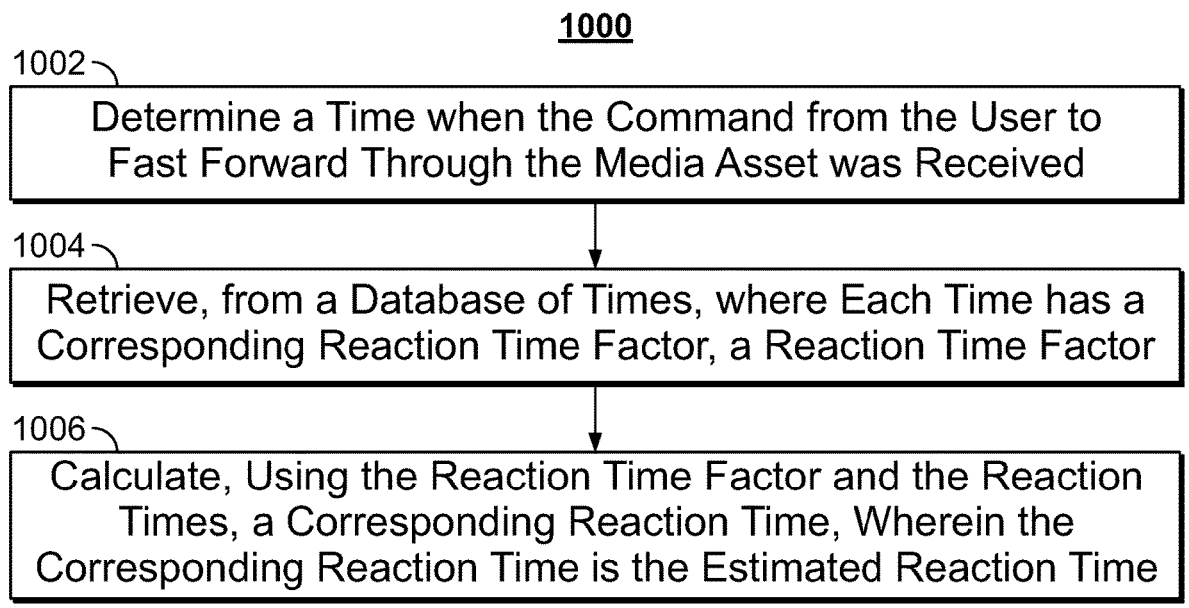
FIG. 10 depicts an illustrative flowchart of a process for calculating, from the reaction times, the estimated reaction time, in accordance with some embodiments of the disclosure.

FIG. 10 depicts an illustrative flowchart of a process for calculating, from the reaction times, the estimated reaction time, in accordance with some embodiments of the disclosure. At 1002, control circuitry 404 determines a time when the command from the user to fast-forward through the media asset was received. Control circuitry 404 retrieves the time from a command history database from storage 408, or from a remote server via communications network 514.

At 1004, control circuitry 404 retrieves, from a database of times, where each time has a corresponding reaction time factor, a reaction time factor. Control circuitry 1004 retrieves, from a database stored in storage 408 or stored on a remote server and retrieved via communications network 514, a reaction time factor for the time. For example, control circuitry 404 may retrieve a reaction time factor (e.g., 2 seconds) for the time (e.g., 11 pm) from storage 408. At 1006, control circuitry 404 calculates, using the reaction time factor and the reaction times, a corresponding reaction time, wherein the corresponding reaction time is the estimated reaction time. Control circuitry 404 calculates the corresponding reaction time using similar methods as described above.

Figure 11:
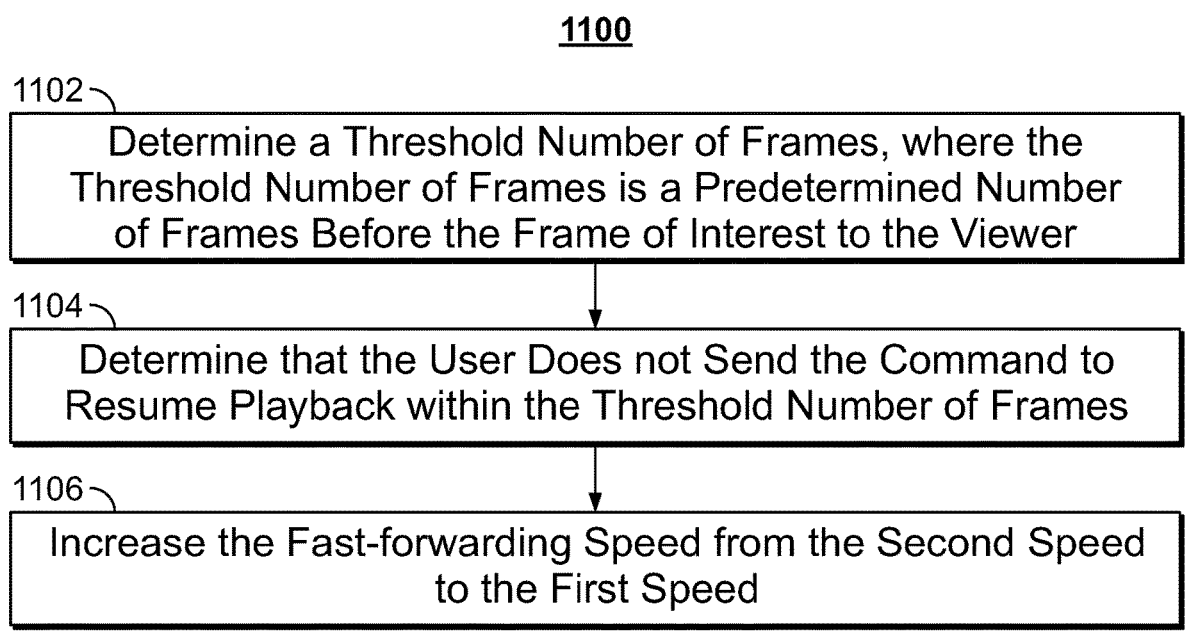
FIG. 11 depicts an illustrative flowchart of a process for receiving the command to resume playback from the user while the fast-forwarding operation is occurring at the second speed, in accordance with some embodiments of the disclosure.

FIG. 11 depicts an illustrative flowchart of a process for receiving the command to resume playback from the user while the fast-forwarding operation is occurring at the second speed, in accordance with some embodiments of the disclosure. At 1102, control circuitry 404 determines a threshold number of frames, where the threshold number of frames is a predetermined number of frames before the frame of interest to the viewer. Control circuitry 404 retrieves the threshold number of frames from a database in storage 408 or from a database stored on a remote server via communications network 514.

At 1104, control circuitry 404 determines that the user does not send the command to resume playback within the threshold number of frames. For example, control circuitry 404 may determine that the user does not send a command to resume playback via user input interface 410 on user television equipment 502 (e.g., a remote controller). At 1106, control circuitry 404 increases the fast-forwarding speed from second speed 118 to first speed 108. For example, control circuitry 404 increases the fast-forwarding speed from second speed 118 (e.g., 1.5×) to first speed 108 (e.g., 3×).

Figure 12:
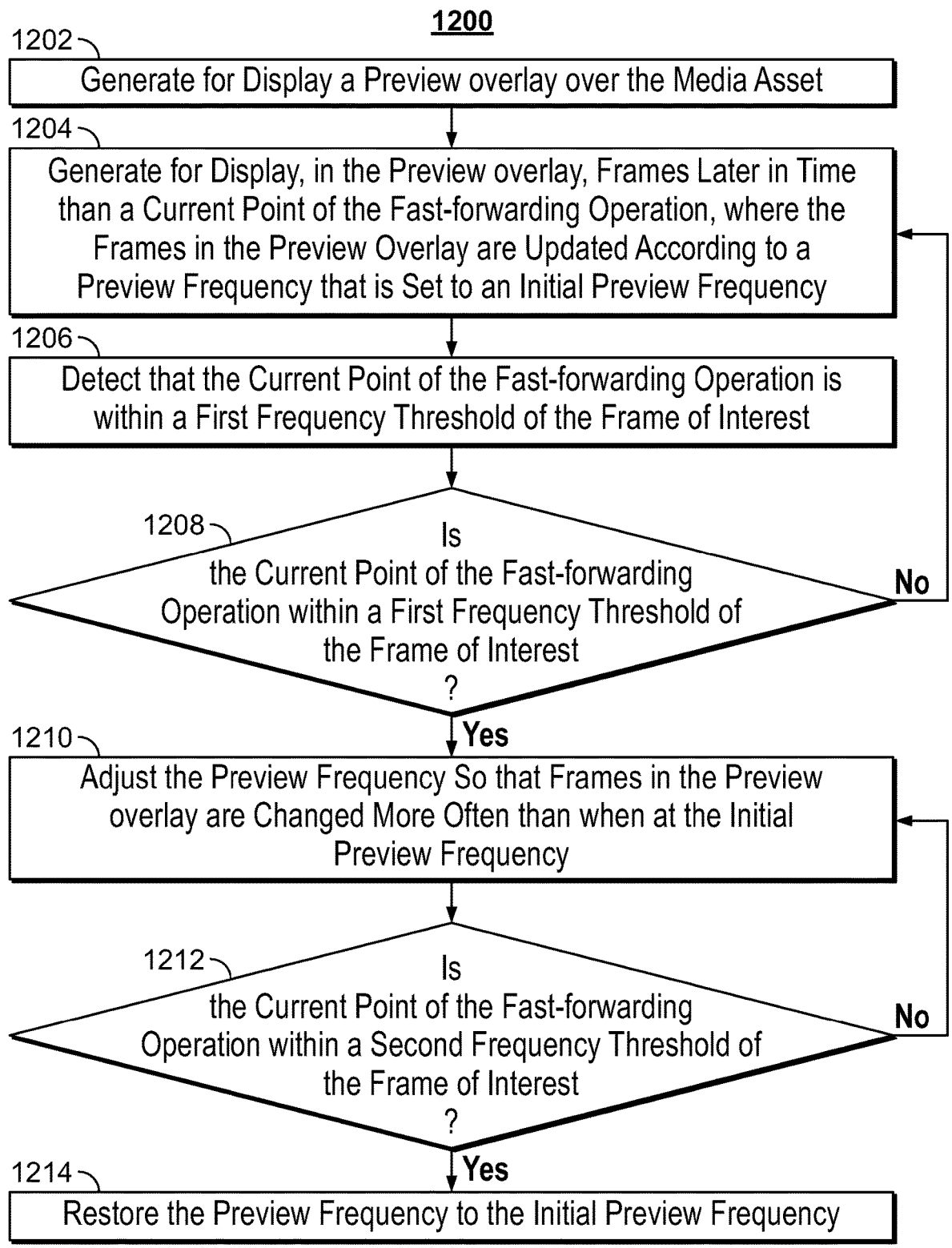
FIG. 12 depicts an illustrative flowchart of a process for executing the fast-forwarding operation, in accordance with some embodiments of the disclosure.

FIG. 12 depicts an illustrative flowchart of a process for executing the fast-forwarding operation, in accordance with some embodiments of the disclosure. At 1202, control circuitry 404 generates for display a preview overlay (e.g., overlay 112, 116, 122, 126, or 130) over media asset 102. At 1204, control circuitry 404 generates for display, in the preview overlay, frames later in time than a current point of the fast-forwarding operation, where the frames in the preview overlay are updated according to a preview frequency that is set to an initial preview frequency. Control circuitry 404 generates the preview overlay to be displayed on display 412. At 1206, control circuitry 404 detects that the current point of the fast-forwarding operation is within a first frequency threshold of the frame of interest. Control circuitry 404 detects that the current point of the fast-forwarding operation is within a first frequency threshold of the frame of interest using similar methods as described above.

At 1208, control circuitry 404 determines whether the current point of the fast-forwarding operation is within a first frequency threshold of the frame of interest. If, at 1208 control circuitry 404 determines that "No," the current point of the fast-forwarding operation is not within a first frequency threshold of the frame of interest, process 1208 reverts to process 1204. If, at 1208 control circuitry 404 determines that "Yes," the current point of the fast-forwarding operation is within a first frequency threshold of the frame of interest, process 1208 proceeds to process 1210.

At 1210, control circuitry 404 adjusts the preview frequency so that frames in the preview overlay (e.g., overlay 112, 116, 122, 126, 130) are changed more often than when at the initial preview frequency. Control circuitry 404 retrieves frames from media content source 516 to display in the preview overlay on display 412 at a higher frequency than the initial preview frequency. At 1212, control circuitry 404 determines whether the current point of the fast-forwarding operation is within a second frequency threshold of the frame of interest. Control circuitry 404 detects that the current point of the fast-forwarding operation is within a second frequency threshold of the frame of interest using similar methods as described above.

If, at 1212 control circuitry 404 determines that "No," the current point of the fast-forwarding operation is not within a second frequency threshold of the frame of interest, process 1212 reverts to 1210. If, at 1212 control circuitry 404 determines that "Yes," the current point of the fast-forwarding operation is within a second frequency threshold of the frame of interest, process 1212 reverts to 1214. At 1214, control circuitry 404 restores the preview frequency to the initial preview frequency.

It should be noted that processes 600-1200 or any step thereof could be performed on, or provided by, any of the devices shown in FIGS. 1 and 4-5. For example, any of processes 600-1200 may be executed by control circuitry 404 (FIG. 4) as instructed by control circuitry implemented on user equipment 502, 504, 506 (FIG. 5), and/or a user equipment device for selecting a recommendation. In addition, one or more steps of processes 600-1200 may be incorporated into or combined with one or more steps of any other process or embodiment.

It is contemplated that the steps or descriptions of each of FIGS. 6-12 may be used with any other embodiment of this disclosure. In addition, the steps and descriptions described in relation to FIGS. 6-12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-12.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device or a random access memory, such as a hard drive device or a computer diskette, having a computer-readable program code stored thereon. It should also be understood that methods, techniques, and processes involved in the present disclosure may be executed using processing circuitry. The processing circuitry, for instance may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings of user equipment 100 stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "related art" or "convention," any such reference is merely for the purpose of providing context to the invention(s) of the instant disclosure, and does not form any admission as to what constitutes the state of the art.

What is claimed is:

1. A method for modifying a fast-forwarding speed based on a reaction time of a user when a frame of interest is detected, comprising:
   receiving a command from a user to fast-forward through a media asset;
   in response to receiving the command, executing a fast-forwarding operation through frames of the media asset at a first speed;
   detecting that the fast-forwarding operation is approaching a frame of interest to the viewer;
   in response to detecting that the fast-forwarding operation is approaching the frame of interest, reducing the fast-forwarding speed to a second speed slower than the first speed, wherein the second speed is determined by:
      retrieving, from a profile for the user, a plurality of reaction times corresponding to a current age of the user;
      calculating, from the average of the reaction times, an estimated reaction time of the user; and
      in response to calculating the estimated reaction time of the user, calculating the second speed from the estimated reaction time of the user;
   receiving a command to resume playback from the user while the fast-forwarding operation is occurring at the second speed; and
   playing back the media asset at a default playback speed from a point corresponding to a moment when the command was received.

2. The method of claim 1, wherein retrieving, from the profile for the user, the plurality of reaction times corresponding to a current age of the user comprises:
   retrieving, from a database, a plurality of data entries corresponding to rewind operations, wherein each rewind operation was initiated by the user within a predetermined time after the user issued an operation to resume playback during a fast-forward operation;
   determining from a data entry in the plurality of data entries, a number of frames in a plurality of frames that the user rewinds through before resuming playback of the media asset; and
   determining from the number of frames the plurality of reaction times corresponding to the current age of the user.

3. The method of claim 2, wherein calculating, from the average of the reaction times, the estimated reaction time of the user comprises:
   determining, from the data entry, a length of time of the rewind operation;
   calculating, from the number of frames and the length of time of the rewind operation, a reaction time of the user in a plurality of reaction times corresponding to a current age of the user;
   determining, from the plurality of reactions times corresponding to a current age of the user, an average reaction time of the user, wherein the average reaction time is the estimated reaction time.

4. The method of claim 1, wherein receiving the command to resume playback from the user while the fast-forwarding operation is occurring at the second speed comprises:
   determining a threshold number of frames, wherein the threshold number of frames is a predetermined number of frames before the frame of interest to the viewer;
   determining that the user does not send the command to resume playback within the threshold number of frames; and
   increasing the fast-forwarding speed from the second speed to the first speed.

5. The method of claim 1, further comprising:
   receiving a command from the user that overrides the command to fast-forward at the second speed;
   determining, based on the override command a third speed; and
   increasing the fast-forwarding speed from the second speed to the third speed.

6. The method of claim 1, further comprising, while the fast-forwarding is reduced to the second speed:
  determining a potential frame of interest that is a threshold number of frames from a current frame; and
  generating for display the potential frame of interest within an overlay on top of the media asset.

7. The method of claim 6, further comprising:
  retrieving, from the profile, preferences for the user;
  determining, from metadata for at least one frame within a plurality of frames, characteristics of the frame;
  comparing the characteristics of the at least one frame with the preferences for the user; and
  determining, from the comparison, the potential frame of interest.

8. The method of claim 1, wherein executing the fast-forwarding operation further comprises:
  generating for display a preview overlay over the media asset;
  generating for display, in the preview overlay, frames later in time than a current point of the fast-forwarding operation, wherein the frames in the preview overlay are updated according to a preview frequency that is set to an initial preview frequency;
  detecting that the current point of the fast-forwarding operation is within a first frequency threshold of the frame of interest;
  in response to detecting that the current point of the fast-forwarding operation is within the first frequency threshold of the frame of interest, adjusting the preview frequency so that frames in the preview overlay are changed more often than when at the initial preview frequency;
  detecting that the current point of the fast-forwarding operation is within a second frequency threshold of the frame of interest; and
  in response to detecting that the current point of the fast-forwarding operation is within the second frequency threshold of the frame of interest, restoring the preview frequency to the initial preview frequency.

9. A system for modifying a fast-forwarding speed based on a reaction time of a user when a frame of interest is detected, comprising:
  user input circuitry; and
  control circuitry configured to:
    receive, using the user input circuitry, a command from a user to fast-forward through a media asset;
    in response to receiving the command, execute a fast-forwarding operation through frames of the media asset at a first speed;
    detect that the fast-forwarding operation is approaching a frame of interest to the viewer;
    in response to detecting that the fast-forwarding operation is approaching the frame of interest, reduce the fast-forwarding speed to a second speed slower than the first speed, wherein the second speed is determined each time by:
      retrieve, from a profile for the user, a plurality of reaction times corresponding to a current age of the user;
      calculate, from the average of the reaction times, an estimated reaction time of the user; and
      in response to calculating the estimated reaction time of the user, calculate the second speed from the estimated reaction time of the user;
    receive, using the user input circuitry, a command to resume playback from the user while the fast-forwarding operation is occurring at the second speed; and
    play back the media asset at a default playback speed from a point corresponding to a moment when the command was received.

10. The system of claim 9, wherein the control circuitry is further configured, when retrieving, from the profile for the user, the plurality of reaction times corresponding to a current age of the user, to:
  retrieve, from a database, a plurality of data entries corresponding to rewind operations, wherein each rewind operation was initiated by the user within a predetermined time after the user issued an operation to resume playback during a fast-forward operation;
  determine from a data entry in the plurality of data entries, a number of frames in a plurality of frames that the user rewinds through before resuming playback of the media asset; and
  determine from the number of frames the plurality of reaction times corresponding to a current age of the user.

11. The system of claim 10, wherein the control circuitry is further configured, when calculating from the average of the reaction times, the estimated reaction time of the user, to:
  determine, from the data entry, a length of time of the rewind operation;
  calculate, from the number of frames and the length of time of the rewind operation, a reaction time of the user in a plurality of reaction times corresponding to a current age of the user;
  determine, from the plurality of reaction times corresponding to a current age of the user, an average reaction time of the user, wherein the average reaction time is the estimated reaction time.

12. The system of claim 9, wherein the control circuitry is further configured, when receiving the command to resume playback from the user while the fast-forwarding operation is occurring at the second speed, to:
  determine a threshold number of frames, wherein the threshold number of frames is a predetermined number of frames before the frame of interest to the viewer;
  determine that the user does not send the command to resume playback within the threshold number of frames; and
  increase the fast-forwarding speed from the second speed to the first speed.

13. The system of claim 9, wherein the control circuitry is further configured to:
  receive, using the user input circuitry, a command from the user that overrides the command to fast-forward at the second speed;
  determine, based on the override command a third speed; and
  increase the fast-forwarding speed from the second speed to the third speed.

14. The system of claim 9, wherein the control circuitry is further configured, while the fast-forwarding is reduced to the second speed, to:
  determine a potential frame of interest that is a threshold number of frames from a current frame; and
  generate for display the potential frame of interest within an overlay on top of the media asset.

15. The system of claim 14, wherein the control circuitry is further configured to:
  retrieve, from the profile, preferences for the user;
  determine, from metadata for at least one frame within a plurality of frames, characteristics of the frame;
  compare the characteristics of the at least one frame with the preferences for the user; and
  determine, from the comparison, the potential frame of interest.

16. The system of claim 9, wherein the control circuitry is further configured, when executing the fast-forwarding operation, to:
- generate for display a preview overlay over the media asset;
- generate for display, in the preview overlay, frames later in time than a current point of the fast-forwarding operation, wherein the frames in the preview overlay are updated according to a preview frequency that is set to an initial preview frequency;
- detect that the current point of the fast-forwarding operation is within a first frequency threshold of the frame of interest;
- in response to detecting that the current point of the fast-forwarding operation is within the first frequency threshold of the frame of interest, adjust the preview frequency so that frames in the preview overlay are changed more often than when at the initial preview frequency;
- detect that the current point of the fast-forwarding operation is within a second frequency threshold of the frame of interest; and
- in response to detecting that the current point of the fast-forwarding operation is within the second frequency threshold of the frame of interest, restore the preview frequency to the initial preview frequency.

* * * * *